US008666580B2

(12) United States Patent
Hashimoto

(10) Patent No.: US 8,666,580 B2
(45) Date of Patent: Mar. 4, 2014

(54) HYBRID VEHICLE AND METHOD FOR CONTROLLING THE SAME

(75) Inventor: Toshiya Hashimoto, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/513,058

(22) PCT Filed: Jun. 7, 2010

(86) PCT No.: PCT/JP2010/059615
§ 371 (c)(1),
(2), (4) Date: May 31, 2012

(87) PCT Pub. No.: WO2011/155015
PCT Pub. Date: Dec. 15, 2011

(65) Prior Publication Data
US 2012/0239237 A1    Sep. 20, 2012

(51) Int. Cl.
B60W 20/00    (2006.01)
(52) U.S. Cl.
USPC .................. 701/22; 180/65.265; 180/65.275; 477/73; 47/90
(58) Field of Classification Search
USPC ............... 701/22; 180/65.265, 65.21, 65.275; 903/930; 123/179.3, 192.1; 477/73, 90, 477/7
See application file for complete search history.

(56) References Cited

U.S. PATENT DOCUMENTS

| 7,032,545 B2* | 4/2006 | Lewis et al. ..................... 123/21 |
| 7,281,510 B2* | 10/2007 | Kondo ........................ 123/179.5 |
| 7,383,820 B2* | 6/2008 | Lewis et al. ................... 123/491 |
| 7,722,498 B2* | 5/2010 | Kawasaki et al. ................. 477/3 |
| 8,191,355 B2* | 6/2012 | Lewis ............................. 60/285 |
| 2003/0154945 A1 | 8/2003 | Ando et al. |
| 2004/0012206 A1* | 1/2004 | Wakashiro et al. ......... 290/40 C |
| 2004/0112654 A1* | 6/2004 | Kozarekar et al. ........... 180/65.2 |
| 2004/0116248 A1* | 6/2004 | Sakamoto et al. ............ 477/107 |
| 2004/0214687 A1* | 10/2004 | Morisawa et al. ............ 477/109 |

(Continued)

FOREIGN PATENT DOCUMENTS

JP    07103051 A  *  4/1995
JP    10002238 A  *  1/1998

(Continued)

OTHER PUBLICATIONS

International Search Report mailed Jul. 6, 2010 of PCT/JP2010/059615.

Primary Examiner — Tuan C. To
(74) Attorney, Agent, or Firm — Kenyon & Kenyon LLP

(57) ABSTRACT

A crankshaft of an engine, an output shaft of a first electric motor, and an output shaft of a second electric motor are directly or indirectly connected to each other mechanically. When the engine is started, a vibration reduction torque is caused to act on the crankshaft that is set in the form of a periodic torque based on the crank angle, so that torque pulsation of the engine is suppressed. The output torque of the first electric motor is controlled in accordance with the sum of a motoring torque and a part of the vibration reduction torque. The output torque of the second electric motor is controlled in accordance with the sum of its essential output torque for causing the vehicle to travel and a torque for compensating for a shortage of the vibration reduction torque that occurs because a part of the vibration reduction torque is output from the first electric motor.

17 Claims, 12 Drawing Sheets

(56) References Cited

U.S. PATENT DOCUMENTS

| | | | |
|---|---|---|---|
| 2005/0247503 A1* | 11/2005 | Imazu | 180/300 |
| 2006/0254558 A1* | 11/2006 | Doering et al. | 123/198 F |
| 2006/0276302 A1* | 12/2006 | Sakamoto et al. | 477/107 |
| 2007/0101965 A1* | 5/2007 | Asahara et al. | 123/192.1 |
| 2007/0222407 A1* | 9/2007 | Sakamoto et al. | 318/611 |
| 2008/0045382 A1 | 2/2008 | Kawasaki et al. | |
| 2008/0249689 A1* | 10/2008 | Matsumoto et al. | 701/48 |
| 2008/0249690 A1* | 10/2008 | Matsumoto et al. | 701/48 |
| 2009/0271057 A1* | 10/2009 | Stone | 701/22 |
| 2010/0241305 A1* | 9/2010 | Itabashi et al. | 701/34 |
| 2011/0153162 A1* | 6/2011 | Kezobo et al. | 701/42 |
| 2012/0016549 A1* | 1/2012 | Katsumata et al. | 701/22 |
| 2012/0160202 A1* | 6/2012 | Vogt et al. | 123/179.25 |

FOREIGN PATENT DOCUMENTS

| | | | |
|---|---|---|---|
| JP | 2003-247438 A | | 9/2003 |
| JP | 2005171914 A | * | 6/2005 |
| JP | 2007-131153 A | | 5/2007 |
| JP | 2007-182181 A | | 7/2007 |
| JP | 2008-024287 A | | 2/2008 |
| JP | 2009247156 A | * | 10/2009 |
| JP | 2010-023790 A | | 2/2010 |
| JP | 2010-064563 A | | 3/2010 |

* cited by examiner

FIG.11

| VIBRATION REDUCTION CONTROL WHEN ENGINE IS STARTED | MG1 | MG2 |
|---|---|---|
| P RANGE | USED | NOT USED |
| OTHER THAN P RANGE | USED | USED |

| CONTROL MODE | I. SINE-WAVE PWM | II. OVERMODULATION PWM | III. RECTANGULAR WAVE (ONE PULSE) |
|---|---|---|---|
| INVERTER'S OUTPUT VOLTAGE WAVEFORM | FUNDAMENTAL WAVE COMPONENT | FUNDAMENTAL WAVE COMPONENT | FUNDAMENTAL WAVE COMPONENT |
| MODULATION RATIO | 0~0.61 | 0.61~0.78 | 0.78 |
| FEATURE | SMALL TORQUE VARIATION | IMPROVED OUTPUT IN MIDDLE-SPEED RANGE | IMPROVED OUTPUT IN HIGH-SPEED RANGE |

FIG.15

| VIBRATION REDUCTION CONTROL WHEN ENGINE IS STARTED | MG1 | MG2 |
|---|---|---|
| RECTANGULAR-WAVE CONTROL | USED | USED |
| PWM CONTROL | USED | NOT USED |

HYBRID VEHICLE AND METHOD FOR CONTROLLING THE SAME

This is a 371 national phase application of PCT/JP2010/059615 filed 7 Jun. 2010, the contents of which are incorporated herein by reference.

FIELD OF THE INVENTION

The present invention relates to a hybrid vehicle and a method for controlling the hybrid vehicle, and more specifically to motor control when the engine is started in the hybrid vehicle.

BACKGROUND OF THE INVENTION

One type of the hybrid vehicle configured so that the engine and first and second motor generators (electric motors) are connected by a three-shaft power split device is disclosed for example in Japanese Patent Laying-Open No. 2007-131153 (PTL 1) and Japanese Patent Laying-Open No. 2003-247438 (PTL 2).

In a drive system of the hybrid vehicle having such a configuration, to a sun gear, a carrier, and a ring gear of a planetary gear train constituting the power split device, the crankshaft of the engine, the output shaft of the first motor generator, and the drive shaft are connected respectively. To the drive shaft, the output shaft of the second motor is further connected. The engine is started by being motored by the first motor generator (MG1). At this time, as the engine is motored, torque pulsation of the engine occurs. Vibration reduction control for suppressing this torque pulsation is disclosed in PTL 1.

According to PTL 1, based on the crank angle of the engine, a vibration reduction torque is set for suppressing the torque pulsation which occurs as the engine is motored. Then, to the output torque of the first motor generator (MG1) which generates a motoring torque for the engine, this vibration reduction torque is added, and accordingly the engine is started.

PTL 2 also discloses control for suppressing generation of gear's abnormal noise when the engine is started in a hybrid vehicle configured similarly to the above-described one. Specifically, PTL 2 discloses that the engine is cranked by the first motor generator (MG1) outputting a torque to which a pushing torque is added that is slightly greater than torque pulsation acting on the ring gear shaft due to torque pulsation of the engine. Thus, even if the engine is started while a lock mechanism (typically parking lock mechanism) is active that locks the drive shaft utilizing meshing of gears, noise due to impinging of the gears on each other can be prevented.

CITATION LIST

Patent Literature

PTL 1: Japanese Patent Laying-Open No. 2007-131153
PTL 2: Japanese Patent Laying-Open No. 2003-247438

SUMMARY OF INVENTION

Technical Problem

As disclosed in PTL 1, in consideration of the periodic vibration reduction torque depending on the crank angle of the engine, the engine is motored to be started, and accordingly, vibrations generated when the engine is started are suppressed. As for the hybrid vehicle configured in the manner disclosed in PTL 1 and PTL 2, the output torque of the motor generator (MG1, MG2) is generally controlled by means of ON/OFF control of power semiconductor switching devices (hereinafter also simply referred to as "switching devices") constituting a power converter such as inverter. More specifically, feedback control in accordance with the pulse width modulation control (PWM control) for example is performed to control ON/OFF of the switching devices so that the output torque of the motor generator meets a torque command value.

At this time, if the torque command value abruptly varies, torque controllability for the torque command value could deteriorate, specifically a transient deviation of the output torque could occur, because of certain limitation of the response of the torque control. In particular, if a positive deviation of the output torque (output torque>torque command value) arises under the condition that the output torque is close to the motor rating, the output torque is excessively large and an overload could be exerted on the components of the battery and the power train.

In view of this, for actual motor control in the hybrid vehicle, a configuration for suppressing abrupt variations of the torque command value is generally provided. For example, variations of a required torque of the motor generator that has directly been set based on the vehicle's drive force for example are smoothed in the direction of time by means of a low-pass filter or the like, and accordingly an actual torque command value is set.

However, if such smoothing is done, the crank-angle-dependent periodic change of the vibration reduction torque which is used when the engine is started as disclosed in PTL 1 is also diminished. As a result, the vibration reduction torque cannot adequately be output by the torque control alone using the first motor generator (MG1) which functions for motoring, and vibrations which occur when the engine is started could not be suppressed sufficiently.

In contrast, if smoothing of the torque command value is stopped when the engine is started, the periodic vibration reduction torque which is synchronized with engine rotations is added to the motoring torque generated in a high-torque range, and accordingly the torque command value varies sharply. Consequently, the problem could arise as described above when the transient deviation, particularly a positive deviation of the output torque occurs.

The present invention has been made to solve the problems above, and an object of the present invention is to suppress vibrations which occur when the engine is started in the hybrid vehicle in which the internal combustion engine, the first motor generator, and the second motor generator are connected to each other through the power split device, while ensuring the controllability of the output torque of each motor generator.

Solution to Problem

According to an aspect of the present invention, a hybrid vehicle includes an internal combustion engine, first and second electric motors, a vibration reduction torque calculation unit, and a torque control unit. The first electric motor is configured to have a power transmission path between the first electric motor and an output shaft of the internal combustion engine, and output a motoring torque when the internal combustion engine is started. The second electric motor is configured to have a power transmission path between the second electric motor and the output shaft of the internal combustion engine. The vibration reduction torque calculation unit is configured to set, when the internal combustion engine is started, a periodic vibration reduction torque for suppressing torque pulsation occurring as the internal combustion engine rotates, based on a rotational position of the output shaft of the internal combustion engine. The torque control unit controls output torques of the first and second electric motors so that a partial torque of the vibration reduction torque is output from the first electric motor and a shortage of the vibration reduction torque due to the partial torque is compensated for by the output torque from the second electric motor.

Preferably, the hybrid vehicle further includes a parking lock mechanism operating when a parking range is selected. The parking lock mechanism is configured to lock a rotational element so that the rotational element does not rotate, the rotational element being included in a power transmission path extending from an output shaft of the second electric motor through a drive shaft to a drive wheel. When the rotational element is locked, the parking lock mechanism is located at a position of blocking the power transmission path between the output shaft of the internal combustion engine and the second electric motor. The internal combustion engine and the second electric motor are mechanically connected to the drive shaft, through respective power transmission paths different from each other. When the parking range is not selected, the torque control unit compensates for the shortage of the vibration reduction torque by the output torque of the second electric motor and, when the parking range is selected, the torque control unit stops compensation for the shortage of the vibration reduction torque by the output torque of the second electric motor.

Still preferably, the hybrid vehicle further includes first and second inverters and a motor control unit. The first inverter controls the first electric motor in accordance with a first torque command value. The second inverter controls the second electric motor in accordance with a second torque command value. The motor control unit selects a mode of electric motor control by the first inverter and the second inverter each, depending on an operating state of the first and second electric motors. The mode includes a first control mode to which rectangular-wave voltage control is applied and a second control mode to which sine-wave pulse width modulation control is applied. When the first control mode is selected for the first inverter, the torque control unit compensates for the shortage of the vibration reduction torque by the output torque of the second electric motor and, when the second control mode is selected for the first inverter, the torque control unit stops compensation for the shortage of the vibration reduction torque by the output torque of the second electric motor.

More preferably, when the first control mode is selected for the first inverter, the torque control unit reduces a ratio of the partial torque to the vibration reduction torque, with respect to a ratio of the partial torque to the vibration reduction torque when the second control mode is selected for the first inverter.

Preferably, the torque control unit controls the output torques of the first and second electric motors so that the partial torque of the vibration reduction torque that is output from the first electric motor and a periodic torque that is output from the second electric motor for compensating for the shortage of the vibration reduction torque are different in phase from each other.

Alternatively, preferably the torque control unit includes a first torque calculation unit for setting the first torque command value for the first electric motor by smoothing a variation in time-axis direction of a first torque corresponding to a sum of the motoring torque and the vibration reduction torque.

More preferably, the torque control unit includes a vibration reduction compensation torque calculation unit, a torque variation restriction unit, and an addition unit. The vibration reduction compensation torque calculation unit is configured to calculate a vibration reduction compensation torque for compensating for the shortage of the vibration reduction torque by the second electric motor, based on a shortage torque corresponding to the shortage of the vibration reduction torque. The torque variation restriction unit is configured to restrict a variation in time-axis direction of a torque command value for the second electric motor on which the vibration reduction compensation torque has not been reflected. The addition unit is configured to calculate the second torque command value for the second electric motor in accordance with a sum of an output of the torque variation restriction unit and the vibration reduction compensation torque calculated by the vibration reduction compensation torque calculation unit.

Still preferably, the torque control unit includes a first torque calculation unit, a vibration reduction compensation torque calculation unit, and a second torque calculation unit. The first torque calculation unit is configured to set, when the internal combustion engine is started, the first torque command value for the first electric motor by adding, to the motoring torque, a partial torque of the vibration reduction torque that is set by the vibration reduction torque calculation unit. The vibration reduction compensation torque calculation unit is configured to calculate a vibration reduction compensation torque for compensating for the shortage of the vibration reduction torque by the second electric motor, based on a shortage torque corresponding to the shortage of the vibration reduction torque. The second torque calculation unit is configured to set, when the internal combustion engine is started, the second torque command value for the second electric motor, so that the vibration reduction compensation torque calculated by the vibration reduction compensation torque calculation unit is reflected on the second torque command value.

Preferably, the hybrid vehicle further includes a three-shaft power input and output mechanism. The power input and output mechanism is mechanically connected to three shafts that are the output shaft of the internal combustion engine, the output shaft of the second electric motor, and an output shaft of the first electric motor, and configured so that, as respective numbers of revolutions of any two of the three shafts are determined, a number of revolutions of the remaining one shaft is determined and, based on power that is input or output to or from any two of the three shafts, power is input or output to or from the remaining one shaft.

According to another aspect of the present invention, a method for controlling a hybrid vehicle is provided. The hybrid vehicle includes an internal combustion engine, first and second electric motors, a vibration reduction torque calculation unit, and a torque control unit. The first electric motor is configured to have a power transmission path between the first electric motor and an output shaft of the internal combustion engine, and output a motoring torque when the internal combustion engine is started. The second electric motor is configured to have a power transmission path between the second electric motor and the output shaft of the internal combustion engine. The method for controlling includes the steps of: setting, when the internal combustion engine is started, a periodic vibration reduction torque for suppressing torque pulsation occurring as the internal combustion engine rotates, based on a rotational position of the output shaft of the internal combustion engine; and controlling output torques of the first and second electric motors so that, when the internal combustion engine is started, a partial torque of the vibration reduction torque is output from the first electric motor and a shortage of the vibration reduction torque due to the partial torque is compensated for by the output torque from the second electric motor.

Preferably, the hybrid vehicle further includes a parking lock mechanism operating when a parking range is selected. The parking lock mechanism is configured to lock a rotational element so that the rotational element does not rotate, the rotational element being included in a power transmission path extending from an output shaft of the second electric motor through a drive shaft to a drive wheel. Further, when the rotational element is locked, the parking lock mechanism is located at a position of blocking the power transmission path between the output shaft of the internal combustion engine and the second electric motor. The method for controlling further includes the step of compensating for the shortage of the vibration reduction torque by the output torque of the second electric motor when the parking range is not selected at startup of the internal combustion engine, and stopping compensation for the shortage of the vibration reduction torque by the output torque of the second electric motor when the parking range is selected at startup of the internal combustion engine.

Still preferably, the hybrid vehicle further includes first and second inverters and a torque control unit. The first inverter controls the first electric motor in accordance with a first torque command value. The second inverter controls the second electric motor in accordance with a second torque command value. The motor control unit selects a mode of electric motor control by the first inverter and the second inverter each, depending on an operating state of the first and second electric motors. The mode includes a first control mode to which rectangular-wave voltage control is applied and a second control mode to which sine-wave pulse width modulation control is applied. The method for controlling further includes the step of compensating for the shortage of the vibration reduction torque by the output torque of the second electric motor when the first control mode is selected for the first inverter, and stopping compensation for the shortage of the vibration reduction torque by the output torque of the second electric motor when the second control mode is selected for the first inverter.

More preferably, the step of controlling includes the step of reducing a ratio of the partial torque to the vibration reduction torque when the first control mode is selected for the first inverter, with respect to a ratio of the partial torque to the vibration reduction torque when the second control mode is selected for the first inverter.

Alternatively, preferably the step of controlling includes the step of controlling the output torques of the first and second electric motors so that the partial torque that is output from the first electric motor and a periodic torque that is output from the second electric motor for compensating for the shortage of the vibration reduction torque are different in phase from each other.

Still preferably, the step of controlling includes the step of setting the first torque command value for the first electric motor by smoothing a variation in time-axis direction of a first torque corresponding to a sum of the motoring torque and the vibration reduction torque.

More preferably, the step of controlling includes the steps of: calculating a shortage torque corresponding to the shortage of the vibration reduction torque; calculating a vibration reduction compensation torque for compensating for the shortage of the vibration reduction torque by the second electric motor, based on the calculated shortage torque; and restricting a variation in time-axis direction of a torque command value for the second electric motor on which the vibration reduction compensation torque has not been reflected, and calculating the second torque command value in accordance with a sum of the restricted torque command value and the vibration reduction compensation torque.

Still preferably, the step of controlling includes the steps of: setting the first torque command value for the first electric motor by adding, to the motoring torque, a partial torque of the vibration reduction torque; calculating a shortage torque corresponding to the shortage of the vibration reduction torque due to the partial torque; calculating a vibration reduction compensation torque to be provided by the second electric motor, based on the calculated shortage torque; and setting, when the internal combustion engine is started, the second torque command value for the second electric motor, so that the vibration reduction compensation torque is reflected on the second torque command value.

Advantageous Effects of Invention

According to the present invention, in the hybrid vehicle in which the internal combustion engine, the first motor generator, and the second motor generator are connected to each other through the power split device, vibrations which occur when the engine is started can be suppressed, while the controllability of the output torque of each motor generator is ensured.

BRIEF DESCRIPTION OF DRAWINGS

FIG. 11 is a table illustrating a relation between vibration reduction control and range selection when the engine is started in the hybrid vehicle according to the second embodiment.

FIG. 15 is a table for illustrating a relation between vibration reduction control and a control mode for a motor generator when the engine is started in the hybrid vehicle according to a third embodiment.

DETAILED DESCRIPTION

Figure 1:
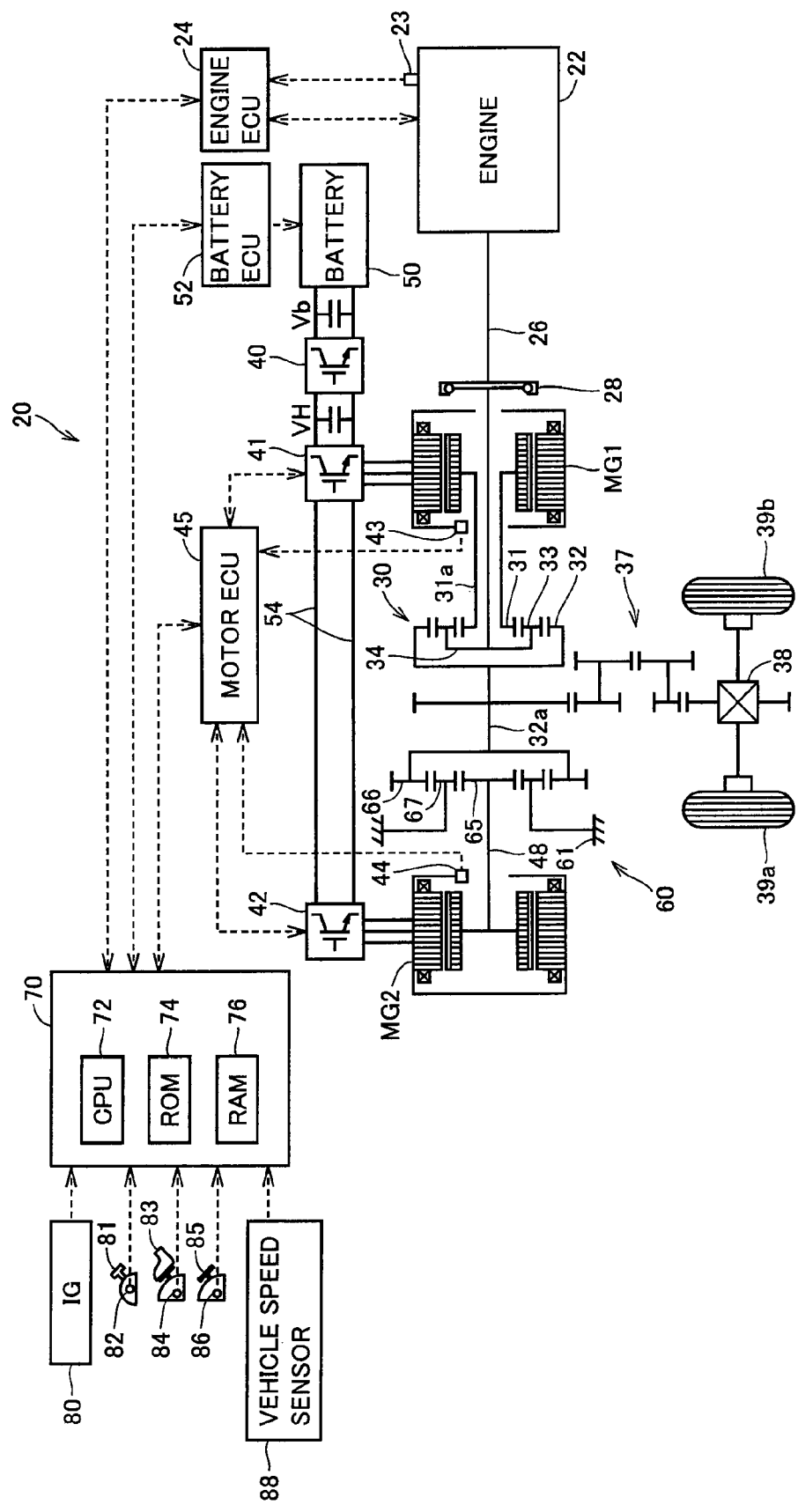
FIG. 1 is a configuration diagram showing a schematic configuration of a hybrid vehicle according to a first embodiment of the present invention.

In the following, embodiments of the present invention will be described in detail with reference to the drawings. In the drawings, the same or corresponding components are denoted by the same reference characters, and a description thereof will not be repeated in principle.

[First Embodiment]

FIG. 1 is a configuration diagram showing a schematic configuration of a hybrid vehicle according to a first embodiment of the present invention.

Referring to FIG. 1, hybrid vehicle 20 in the first embodiment includes an engine 22, a crankshaft 26 serving as "output shaft" of engine 22, a torsional damper 28, and a three-shaft power split device 30. Crankshaft 26 is connected through torsional damper 28 to power split device 30.

Hybrid vehicle 20 further includes a motor generator MG1 connected to power split device 30, a motor generator MG2 connected to power split device 30 through a transmission 60, and a hybrid-adapted electronic control unit (hereinafter also referred to as "HVECU") 70 controlling the whole drive system of hybrid vehicle 20. Motor generators MG1, MG2 correspond respectively to "first electric motor" and "second electric motor." Motor generators MG1, MG2 are each capable of outputting both a positive torque and a negative torque, and each can be driven as an electric motor and can also be driven as an electric generator. Power split device 30 corresponds to "three-shaft power input and output mechanism." A sun gear shaft 31a corresponds to "rotational shaft" of "three-shaft power input and output mechanism."

Engine 22 is an "internal combustion engine" that outputs power generated from a hydrocarbon fuel such as gasoline or light oil. An engine-adapted electronic control unit (hereinafter also referred to as "engine ECU") 24 receives signals that are input from various sensors that detect the operating state of engine 22, such as crank angle CA of crankshaft 26 from a crank angle sensor 23. Engine ECU 24 communicates with HVECU 70 and receives from HVECU 70 a control command for engine 22. Engine ECU 24 performs engine control such as fuel injection control and ignition control as well as intake-air-quantity control for engine 22, according to the operating state of engine 22 based on signals from various sensors, so that engine 22 is operated in accordance with the control command from HVECU 70. Further, engine ECU 24 outputs data concerning the operating state of engine 22 to HVECU 70 as required.

Power split device 30 includes an external-tooth sun gear 31, an internal-tooth ring gear 32 placed concentrically with this sun gear 31, a plurality of pinion gears 33 meshing with sun gear 31 and also meshing with ring gear 32, and a carrier 34. Carrier 34 is configured to hold a plurality of pinion gears 33 in such a manner that allows each pinion gear to rotate about its axis and to revolve. Power split device 30 is configured in the form of a planetary gear train performing the differential function using sun gear 31, ring gear 32, and carrier 34 as rotational elements.

To carrier 34, crankshaft 26 of engine 22 is connected. To sun gear 31, the output shaft of motor generator MG1 is connected through sun gear shaft 31a. A ring gear shaft 32a serving as "drive shaft" is rotated as ring gear 32 is rotated. To ring gear shaft 32a, the output shaft of motor generator MG2 is connected through transmission 60. In the following, ring gear shaft 32a will also be referred to as drive shaft 32a.

Drive shaft 32a is mechanically connected to drive wheels 39a, 39b through a gear mechanism 37 and a differential gear 38. Thus, the power that is output by power split device 30 to ring gear 32, namely drive shaft 32a, is output to drive wheels 39a, 39b through gear mechanism 37 and differential gear 38.

When motor generator MG1 functions as an electric generator, the power from engine 22 that is input from carrier 34 is distributed between sun gear 31 side and ring gear 32 side in accordance with the gear ratio therebetween. In contrast, when motor generator MG1 functions as an electric motor, the power from engine 22 that is input from carrier 34 and the power from motor generator MG1 that is input from sun gear 31 are integrated to be output to ring gear 32.

Motor generators MG1, MG2 are each typically constituted of a three-phase permanent-magnet synchronous motor. Motor generators MG1, MG2 provide and receive electric power through a converter 40 and inverters 41, 42 to and from a battery 50. Inverters 41, 42 are each constituted of a common three-phase inverter having a plurality of switching devices.

Converter 40 performs bidirectional DC voltage conversion between voltage VH on an electric power line 54 and voltage Vb of battery 50. Converter 40 is constituted for example of a bidirectional-current-type boost chopper circuit. The duty of the switching device (not shown) of the boost chopper circuit is controlled so that voltage VH on electric power line 54 agrees with voltage command value VHr. Inverters 41, 42 apply to motor generators MG1, MG2 a pseudo AC voltage made up of a collection of voltage pulses generated by switching DC voltage VH through ON and OFF of the switching devices.

Electric power line 54 which electrically connects converter 40 and inverters 41, 42 is configured in the form of a positive bus and a negative bus shared by inverters 41, 42. Therefore, the electric power generated by one of motor generators MG1, MG2 can be consumed by the other motor. Accordingly, battery 50 is charged with the electric power generated by one of motor generators MG1, MG2 or discharges electric power corresponding to shortage of electric power to motor generator MG1 or MG2. If the balance of electric power is kept by motor generators MG1, MG2, battery 50 is not charged/discharged.

Drive of motor generators MG1, MG2 both is controlled by a motor-adapted electronic control unit (hereinafter also referred to as "motor ECU") 45. To motor ECU 45, signals necessary for controlling drive of motor generators MG1, MG2 are input. For example, signals such as signals from rotational position detection sensors 43, 44 detecting the rotational position of the rotor of motor generators MG1, MG2 and a phase current applied to motor generators MG1, MG2 that is detected by a current sensor (not shown) are input to motor ECU 45.

Motor ECU 45 communicates with HVECU 70 and, in accordance with an operation command from HVECU 70, motor ECU 45 controls drive of motor generators MG1, MG2. Specifically, motor ECU 45 outputs a switching control signal to inverters 41, 42 so that respective output torques of motor generators MG1 and MG2 agree with torque command values Tqcom1 and Tqcom2. For example, motor ECU 45 calculates, based on a difference between a current command value which is set in accordance with torque command values Tqcom1, Tqcom2, and the detected value of current of motor generators MG1, MG2, an output voltage command (AC voltage) for inverters 41, 42. Then, a switching control signal for inverters 41, 42 is generated in accordance for example with pulse width modulation control, so that the pseudo AC voltage that is output from inverters 41, 42 becomes close to a corresponding output voltage command. Further, motor ECU 45 outputs to HVECU 70 data concerning the operating state of motor generators MG1, MG2 as required.

Transmission 60 is configured to provide a predetermined reduction gear ratio between an output shaft 48 of motor generator MG2 and drive shaft 32a. Transmission 60 is typically constituted of a planetary gear train. Transmission 60 includes an external-tooth sun gear 65, an internal-tooth ring gear 66 placed concentrically with this sun gear 65, and a plurality of pinion gears 67 that mesh with sun gear 65 and also mesh with ring gear 66. Since the planetary carrier is fixed to a case 61, a plurality of pinion gears 67 each only rotate about its axis without making revolutions. Namely, the ratio of the number of revolutions between sun gear 65 and ring gear 66 (reduction gear ratio) is fixed.

Battery 50 is managed by a battery-adapted electronic control unit (hereinafter also referred to as "battery ECU") 52. To battery ECU 52, signals that are necessary for managing battery 50 are input. For example, signals such as the terminal-to-terminal voltage from a voltage sensor (not shown) disposed between the terminals of battery 50, the charge/discharge current of battery 50 from a current sensor (not shown), and the battery temperature from a temperature sensor (not shown) attached to battery 50 are input to battery ECU 52. Battery ECU 52 outputs data concerning the state of battery 50 by means of communication to HVECU 70, as required. Here, in order to manage battery 50, battery ECU 52 also calculates the remaining capacity (SOC: State of Charge) based on the integral of the charge/discharge current detected by the current sensor.

HVECU 70 is configured to serve as a microprocessor having a CPU 72 as a main component. HVECU 70 includes CPU (Central Processing Unit) 72, a ROM (Read Only Memory) 74 storing process program, map, and the like, a RAM (Random Access Memory) 76 temporarily storing data, as well as an input/output port and a communication port (not shown). To HVECU 70, signals are input through the input port, such as an ignition signal from an ignition switch 80, shift position SP from a shift position sensor 82 detecting the operating position of a shift lever 81, accelerator pedal position Acc from an accelerator pedal position sensor 84 detecting the pedal position of accelerator pedal 83, brake pedal position BP from a brake pedal position sensor 86 detecting the pedal position of brake pedal 85, and vehicle speed V from a vehicle speed sensor 88.

Further, HVECU 70 is connected through the communication port to engine ECU 24, motor ECU 45, and battery ECU 52 as described above. Thus, HVECU 70 communicates various control signals and data with other ECUs. Here, engine ECU 24, motor ECU 45, and battery ECU 52 can also be configured in the form of a microprocessor, like HVECU 70. Further, while FIG. 1 shows HVECU 70, engine ECU 24, motor ECU 45, and battery ECU 52 as separate ECUs, an ECU into which these functions are partially or entirely incorporated can also be arranged. Alternatively, ECUs may be arranged in such a manner that the functions of each ECU are provided by separate ECUs.

In hybrid vehicle 20 of the first embodiment configured in the above-described manner, HVECU 70 calculates a required torque to be output to drive shaft 32a, based on vehicle speed V and accelerator pedal position Acc corresponding to the pedal position of accelerator pedal 83 depressed by the driver. In order that required power corresponding to this required torque may be output to drive shaft 32a, engine 22 and motor generators MG1, MG2 are controlled in accordance with any of the operating modes as described below.

In the case of the EV (Electric Vehicle) operating mode, the operation of engine 22 is stopped and motor generators MG1, MG2 are controlled so that the power which meets the required power is output from motor generator MG2 to drive shaft 32a.

In the case of the HV (Hybrid Vehicle) operating mode, engine 22 is operated and hybrid vehicle 20 travels using the power from engine 22 and the power from motor generators MG1, MG2. For example, the operation of engine 22 is controlled so that the power that meets the sum of the required power and the electric power which is necessary for charging/discharging battery 50 is output from engine 22. Further, the output torque of motor generators MG1, MG2 is controlled so that the whole or a part of the power that is output from engine 22 which involves charging/discharging of battery 50 is converted by power split device 30 and motor generators MG1, MG2 into a torque and thus the required power is output to drive shaft 32a.

Alternatively, the operation of engine 22 is controlled so that the power which meets the required power is output from engine 22 and motor generators MG1, MG2 are controlled so that the whole of the power which is output from engine 22 is converted by power split device 30 and motor generators MG1, MG2 into a torque and output to drive shaft 32a.

Figure 2:
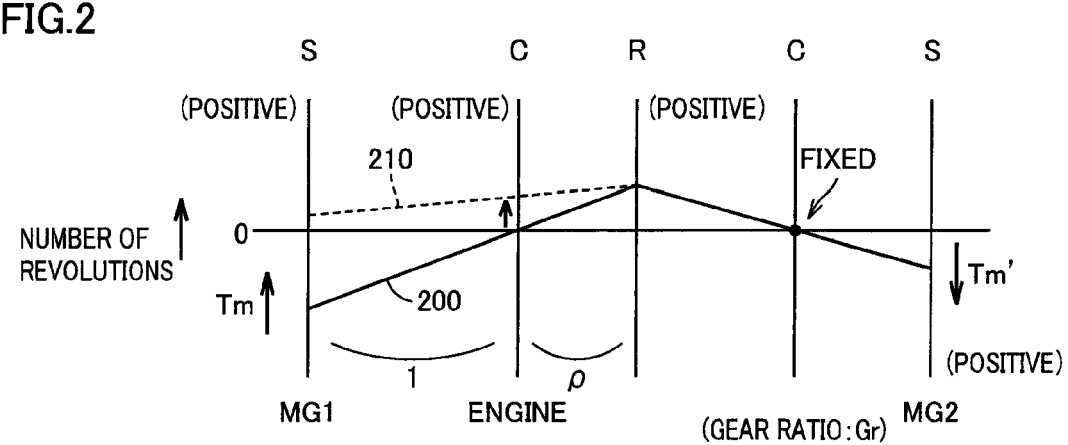
FIG. 2 is a nomographic chart showing a relation between respective numbers of revolutions of motor generators MG1, MG2 and an engine.

FIG. 2 is a nomographic chart showing a relation between respective numbers of revolutions of motor generators MG1, MG2 and the engine connected to the power split device.

Referring to FIG. 2, the number of revolutions of motor generator MG1 connected to sun gear 31, the number of revolutions of the engine connected to carrier 34, and the number of revolutions of ring gear 32 are connected by the nomographic chart shown in FIG. 2. Thus, power split device 30 is configured so that, as respective numbers of revolutions of two of the output shaft (sun gear 31) of motor generator MG1, crankshaft 26 (carrier 34), and drive shaft 32a (ring gear 32) are determined, the number of revolutions of the remaining one shaft is accordingly determined, and so that, based on the power that is input/output to/from any two of the three shafts, the power is input/output to/from the remaining one shaft.

Nomographic chart 200 of FIG. 2 shows a state where the vehicle is traveling with the engine stopped. At this time, the ratio between the number of revolutions of ring gear 32 (drive shaft 32a) and the number of revolutions of sun gear 31 (motor generator MG1) is gear ratio p of power split device 30. Further, the ratio between the number or revolutions of ring gear 32 (drive shaft 32a) and the number of revolutions of motor generator MG2 connected to sun gear 65 is gear ratio Gr provided by transmission 60.

Thus, in the state of nomographic chart 200, while the engine's number of revolutions is zero, motor generator MG1 rotates in the negative direction and motor generator MG2 rotates in the positive direction to thereby cause drive shaft 32a to revolve in the positive direction and thus cause hybrid vehicle 20 to travel.

As this state changes to the state of a nomographic chart 210, engine 22 is started. At this time, motor generator MG1 outputs motoring torque Tm to accordingly increase the number of revolutions of engine 22. Further, in addition to motoring by motor generator MG1, the fuel injection control and the ignition timing control are performed for starting engine, and accordingly engine 22 is started smoothly.

At this time, motor generator MG2 outputs torque Tm' for cancelling a torque acting on ring gear 32 by motoring performed by motor generator MG1.

As to how the motoring torque is set when the engine is started, a description will be given using FIG. 3. Motoring torque Tm is a torque for motoring engine 22 by motor generator MG1 when engine 22 is started.

Figure 3:
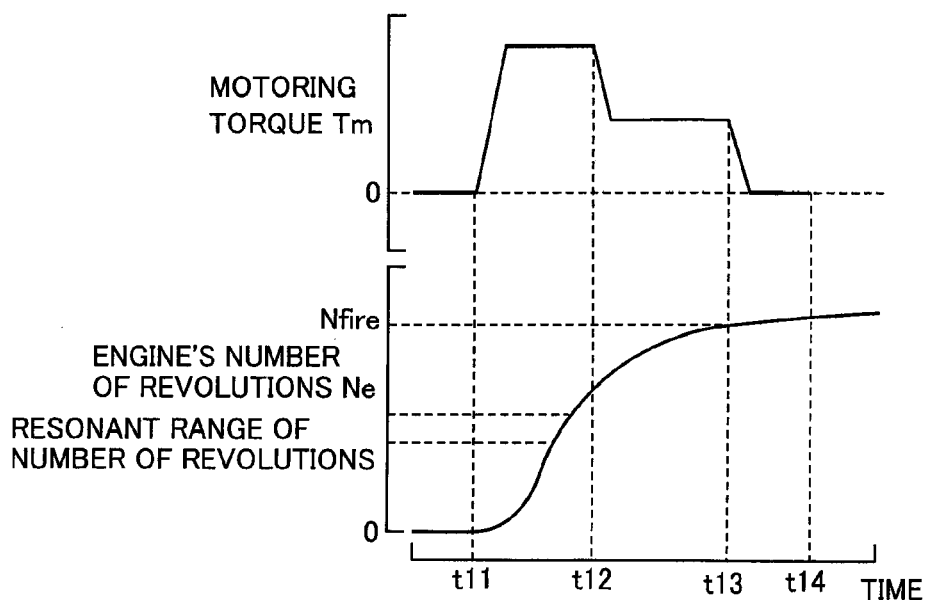
FIG. 3 is a waveform chart showing an example of how a motoring torque at startup of the engine is set.

Referring to FIG. 3, motoring torque Tm is set in accordance with a motoring torque setting map in which the relation between engine's number of revolutions Ne, the time passed from initiation of the engine startup, and motoring torque Tm is determined in advance. The motoring torque setting map is stored in advance in ROM 74. For example, when engine 22 is to be started, based on given engine's number of revolutions Ne and time passed from initiation of the engine startup, HVECU 70 derives and sets associated motoring torque Tm from the motoring torque setting map.

According to the exemplary motoring torque setting map shown in FIG. 3, immediately after time t11 at which an instruction to start engine 22 is given, a relatively large torque is quickly set as motoring torque Tm with the torque increased at a constant rate. In this way, engine's number of revolutions Ne can be increased quickly.

At time t12 at which engine's number of revolutions Ne has exceeded the resonant range of the number of revolutions or at which the time required for the engine's number of revolutions to exceed the resonant range of the number of revolutions has elapsed, motoring torque Tm is reduced. Thus, consumption of electric power and the counterforce of drive shaft 32 are reduced. Here, the reduced motoring torque Tm is set to a torque that enables engine 22 to be motored stably at a number of revolutions higher than the number of revolutions Nfire at the start of ignition. Here, the ignition-start number of revolutions Nfire is set to a large number of revolutions (such as 1000 to 1200 rpm for example) having an allowance relative to the resonant range of the number of revolutions in the embodiment.

Further, from time t13 at which the engine's number of revolutions Ne reaches the ignition-start number of revolutions Nfire, motoring torque Tm is reduced at a certain rate to zero. Then, after time t14 at which complete explosion of engine 22 is detected, the output of motoring torque Tm is completely stopped.

In this way, immediately after the instruction to start engine 22 is given, motoring torque Tm is set to a large torque to motor engine 22. In this way, engine 22 can be started so that the engine's number of revolutions Ne quickly becomes larger than the ignition-start number of revolutions Nfire.

Figure 4:
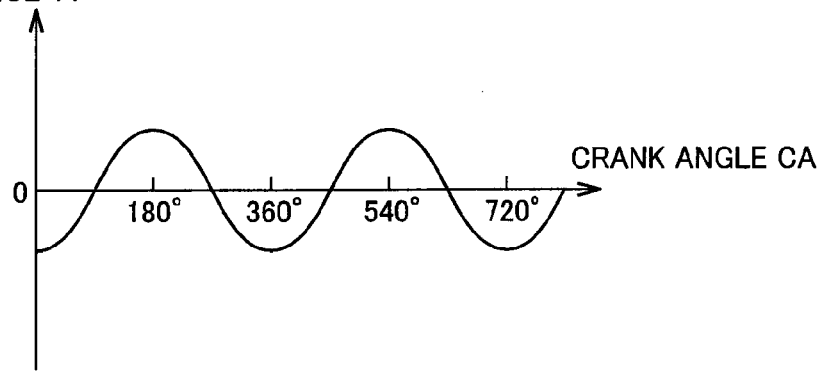
FIG. 4 is a waveform chart showing an example of how a vibration reduction torque for motoring is set according to the crank angle.

As also described in PTL 1, it is known that torque pulsation occurs depending on crank angle CA when engine 22 is started. Therefore, for hybrid vehicle 20 of the present embodiment as well, vibration reduction torque Tv is set similarly to PTL 1, when engine 22 is started. FIG. 4 shows an example of how vibration reduction torque Tv is set.

Referring to FIG. 4, vibration reduction torque Tv is a periodic torque depending on crank angle CA that is to be applied to crankshaft 26 for making constant the amount of torsion of torsional damper 28. The relation between crank angle CA and torque pulsation which occurs when engine 22 is motored can be determined through an experiment for example to accordingly set, in advance, vibration reduction torque Tv in the form of a torque of the opposite phase for suppressing torque pulsation.

Specifically, the relation shown in FIG. 4 between crank angle CA and required vibration reduction torque Tv is stored in the form of a vibration-reduction-torque setting map in ROM 74 in advance. When motoring is done, as crank angle CA is given, associated vibration reduction torque Tv can be derived and set from the vibration-reduction-torque setting map. Namely, FIG. 4 corresponds to an example of the vibration-reduction-torque setting map. Here, it is noted for the sake of confirmation that crank angle CA when motoring is done can be determined by calculation using the rotational angles of motor generators MG1, MG2 detected by rotational position detection sensors 43, 44, based on the method disclosed in PTL 1.

As seen from the above, when engine 22 is started, vibration reduction torque Tv (FIG. 4) can be applied in addition to motoring torque Tm (FIG. 3) to crankshaft 26 to thereby suppress vibrations of engine 22.

Figure 5:
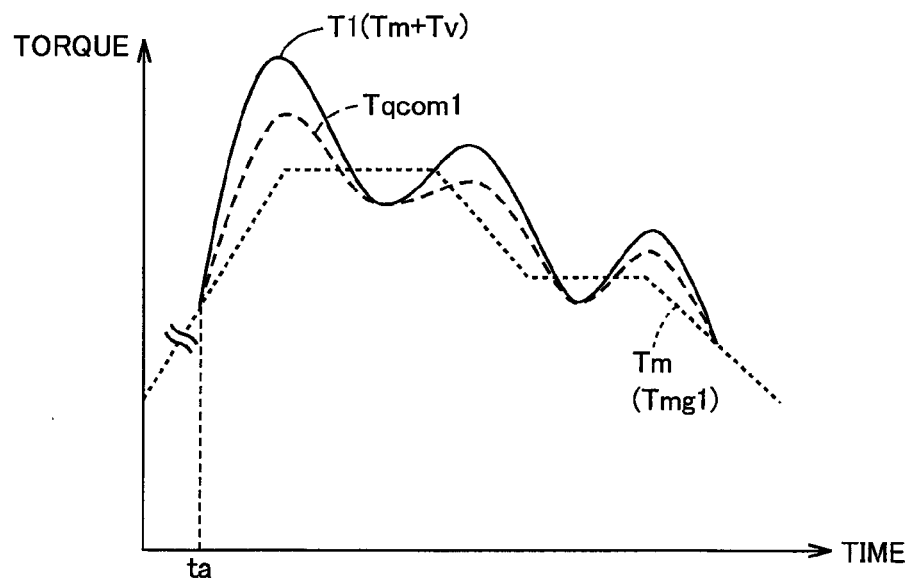
FIG. 5 is a graph showing how a torque command value for a motor generator is set when the engine is started.

FIG. 5 is a graph showing how the torque command value for motor generator MG1 is set when the engine is started. As described above, motor generator MG1 has the function of generating a motoring torque when engine 22 is started.

Referring to FIG. 5, when engine 22 is started, motoring torque Tm shown in FIG. 3 is required as base torque Tmg1 of motor generator MG1. Further, to base torque Tmg1, vibration reduction torque Tv for suppressing vibrations of engine 22 is added. The resultant torque T1 (T1=Tm+Tv) is a basic torque command value for motor generator MG1. FIG. 5 shows torque T1 after time ta.

However, if the torque command value for motor generator MG1 varies sharply in the direction of the time axis, torque control for motor generator MG1 could not follow the variation and accordingly the torque controllability could be deteriorated. In view of this, the basic torque command value is passed through a low-pass filter or the like to set an actual torque command value so that the variation is restricted. In this way, the components of the battery and the power train are prevented from being overloaded due to the deteriorated torque controllability for the torque command value, more specifically due to an increased transient deviation of the output torque relative to the torque command value.

For example, as shown in FIG. 5, basic torque command value T1 (T1=Tm+Tv) is passed through a low-pass filter and accordingly torque command value Tqcom1 having the smoothed variation in the direction of the time axis can be obtained. Thus, in actual torque command value Tqcom1, the periodic component of vibration reduction torque Tv has been diminished.

As a result, periodic vibration reduction torque Tv for suppressing vibrations of engine 22 is not wholly included in actual torque command value Tqcom1. Rather, only a part of the periodic torque component corresponding to vibration reduction torque Tv is reflected on actual torque command value Tqcom1. It is thus understood that actual torque command value Tqcom1 involves a torque shortage relative to vibration reduction torque Tv.

Figure 6:
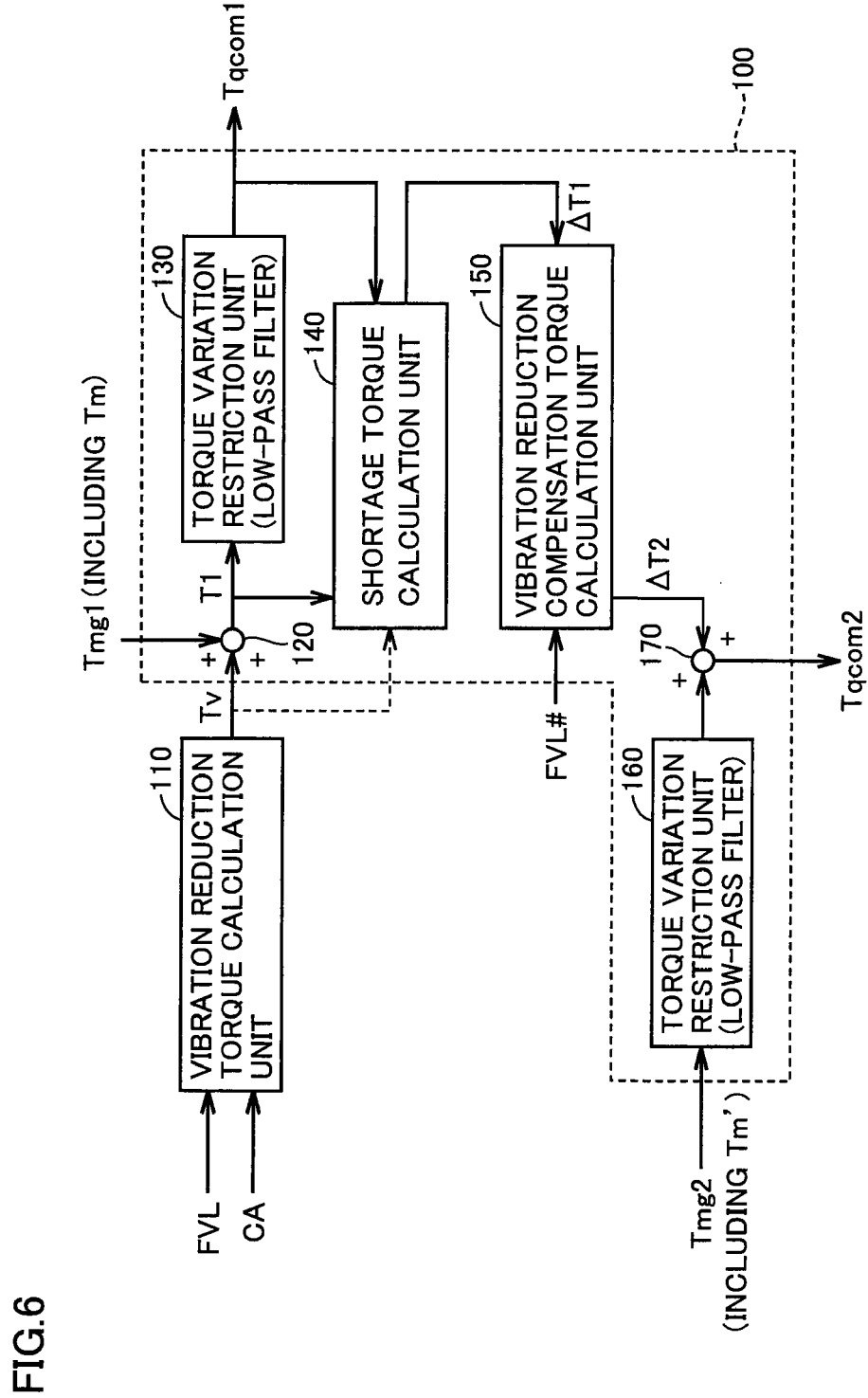
FIG. 6 is a functional block diagram illustrating how torque command values for motor generators are set when the engine is started in the hybrid vehicle according to the first embodiment of the present invention.

FIG. 6 is a functional block diagram illustrating how the torque command values for motor generators MG1, MG2 are set when the engine is started in the hybrid vehicle according to the first embodiment of the present invention. Each functional block shown in FIG. 6 may be implemented by execution of a predetermined program (software processing) by HVECU 70 and/or motor ECU 45, or by an operation of an electronic circuit configured in the ECU (hardware processing).

Referring to FIG. 6, base torque Tmg1 of motor generator MG1 includes motoring torque Tm shown in FIG. 3. When the engine is started, base torque Tmg1 substantially corresponds to motoring torque Tm.

A vibration reduction torque calculation unit 110 calculates, when flag FVL is made ON for giving an instruction to perform vibration reduction control at the startup of the engine, vibration reduction torque Tv based on the rotational angle (crank angle CA) of crankshaft 26. For example, in a similar manner to PTL 1, based on crank angle CA calculated using the rotational angles of motor generators MG1, MG2, the map shown in FIG. 4 is referenced to calculate vibration reduction torque Tv. In the case where flag FVL is OFF, vibration reduction torque calculation unit 110 fixes vibration reduction torque Tv to zero, namely Tv=0.

A torque control unit 100 controls, as vibration reduction torque Tv is calculated when the engine is started, the output torques of motor generators MG1, MG2 so that vibration reduction torque Tv is ensured by motor generators MG1, MG2. Specifically, torque command Tqcom1 for motor generator MG1 and torque command Tqcom2 for motor generator MG2 are set so that the calculated vibration reduction torque Tv is reflected on them.

Torque control unit 100 includes an addition unit 120, a torque variation restriction unit 130, a shortage torque calculation unit 140, a vibration reduction compensation torque calculation unit 150, a torque variation restriction unit 160, and an addition unit 170.

Addition unit 120 adds base torque Tmg1 and vibration reduction torque Tv together to thereby calculate basic torque command value T1.

Figure 7:
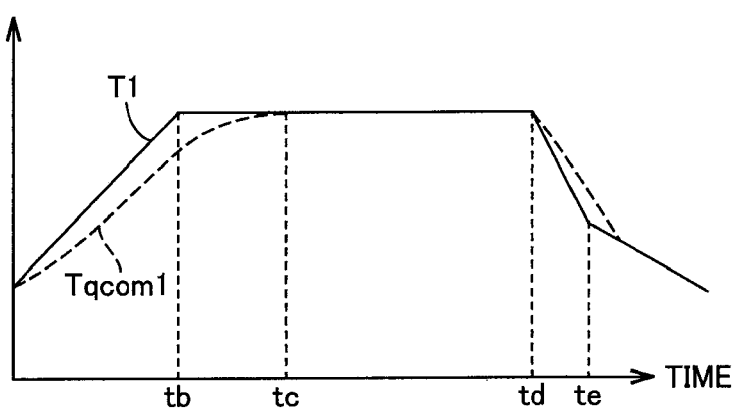
FIG. 7 is a waveform chart illustrating an example of the low-pass filter's function provided by a torque variation restriction unit.

Torque variation restriction unit 130 generates actual torque command value Tqcom1 so that the torque variation in the direction of the time axis is suppressed in basic torque command value T1. Torque variation restriction unit 130 is typically constituted of a low-pass filter. FIG. 7 is a waveform chart showing an example of the low-pass filter's function provided by torque variation restriction unit 130.

In FIG. 7, the example is illustrated where basic torque command value T1 increases at a constant rate until time tb, is kept from time tb to time td, thereafter decreases from time td, and further decreases from time to at a smaller rate.

For the increase of torque command value T1, actual torque command value Tqcom1 is set according to the output of the low-pass filter to which torque command value T1 has been input. Namely, the variation of torque command value T1 on the time axis is reflected on actual torque command value Tqcom1 in accordance with the time constant of the low-pass filter. As a result, there arises a time lag between the timing (time tb) at which the increase of basic torque command value T1 is completed and the timing (time tc) at which actual torque command value Tqcom1 becomes identical to basic torque command value T1. In this way, the sharp variation of the increase of the torque command value is suppressed to thereby lessen the risk that an excessive torque is output from motor generator MG1 due to generation of a deviation relative to the torque command value.

For the decrease of torque command value T1, in consideration of the response of the torque control, a predetermined upper limit is defined on the rate of decrease, based on which torque command value T1 is reflected on torque command value Tqcom1. For example, in the period from time td to time te, the rate of decrease of torque command value T1 is larger than the upper limit of the rate of decrease, and therefore, the decrease of actual torque command value Tqcom1 is made smaller than the decrease of torque command value T1. In contrast, after time te, the rate of decrease of torque command value T1 is smaller than the upper limit of the rate of decrease, and therefore, Tqcom1=T1 is reached finally.

Referring again to FIG. 6, shortage torque calculation unit 140 calculates shortage torque ΔT1 based on the difference between basic torque command value T1 and actual torque command value Tqcom1. As seen from FIG. 5, this shortage torque ΔT1 chiefly includes a shortage relative to the periodic variation of vibration reduction torque Tv, since the variation of vibration reduction torque Tv is sharper than the variation of motoring torque Tm.

Thus, in order to restrict the variation of the torque command value, torque variation restriction unit 130 sets actual torque command value Tqcom1 so that only a part of vibration reduction torque Tv calculated by vibration reduction torque calculation unit 110 is reflected on the actual torque command value. Torque variation restriction unit 130 may also use means other than the low-pass filter to restrict the variation of the torque command value.

Here, shortage torque calculation unit 140 may be configured to calculate shortage torque ΔT1 based on vibration reduction torque Tv, using a calculation formula or the like prepared in consideration of the characteristics of torque variation restriction unit 130. In this case, the restriction and characteristics of the torque control by means of motor generator MG1 may be reflected in the feed-forward manner to calculate shortage torque ΔT1.

Vibration reduction compensation torque calculation unit 150 calculates, when flag FVL# is ON, vibration reduction compensation torque ΔT2 based on shortage torque ΔT1. Flag FVL# is rendered ON under the conditions that the vibration reduction torque is generated (when flag FVL is ON) and that the state of the vehicle allows the vibration reduction torque to be compensated for by means of motor generator MG2. In the first embodiment, flag FVL# is made ON/OFF identically to ON/OFF of flag FVL. In contrast, when flag FVL# is OFF, vibration reduction compensation torque calculation unit 150 fixes vibration reduction compensation torque ΔT2 to zero, namely ΔT2=0.

Vibration reduction compensation torque calculation unit 150 typically acts as a proportional control element. Namely, ΔT2=kp·ΔT1 is solved to calculate vibration reduction compensation torque ΔT2. Proportional gain kp is set for example to k=(1/ρ)·(1/Gr) in accordance with gear ratio ρ of power split device 30 and gear ratio Gr of transmission 60.

Base torque Tmg2 of motor generator MG2 that is input to torque variation restriction unit 160 is represented by the sum of required torque Tr of motor generator MG2 for causing the vehicle to travel, and torque Tm' for cancelling motoring torque Tm acting on ring gear 32. Namely, it is represented by Tmg2=(Tr+Tm')/Gr. Here, according to the gear ratio of power split device 30, the relation Tm'=Tm/ρ is satisfied.

Torque variation restriction unit 160 is configured similarly to torque variation restriction unit 130 to smooth base torque Tmg2 in the direction of the time axis. Namely, torque variation restriction unit 160 acts on base torque Tmg2 so that the torque variation with the passage of time is restricted.

Addition unit 170 generates torque command value Tqcom2 for motor generator MG2, in accordance with the sum of base torque Tmg2 having passed through torque variation restriction unit 160 and vibration reduction compensation torque ΔT2 calculated by vibration reduction compensation torque calculation unit 150.

Since vibration reduction compensation torque ΔT2 is a part of vibration reduction torque Tv that is not reflected by motor generator MG1, the variation of this compensation torque with time is not conspicuously sharp. Therefore, vibration reduction compensation torque ΔT2 can be reflected on torque command value Tqcom2 without being passed through torque variation restriction unit 160. Thus, the variation of required torque Tr is suppressed by torque variation restriction unit 160 so that torque command value Tqcom2 does not sharply vary and, when the engine is started, the shortage of vibration reduction torque Tv of motor generator MG1 can be compensated for.

In this way, torque control unit 100 controls the output torques of motor generators MG1, MG2 so that a part of vibration reduction torque Tv is output from motor generator MG1 and the shortage relative to vibration reduction torque Tv (shortage torque ΔT1) is compensated for by the output torque (vibration reduction compensation torque ΔT2) from motor generator MG2.

In the configuration of FIG. 6, torque variation restriction unit 130 corresponds to "first torque calculation unit" and torque variation restriction unit 160 and addition unit 170 correspond to "second torque calculation unit."

Figure 8:
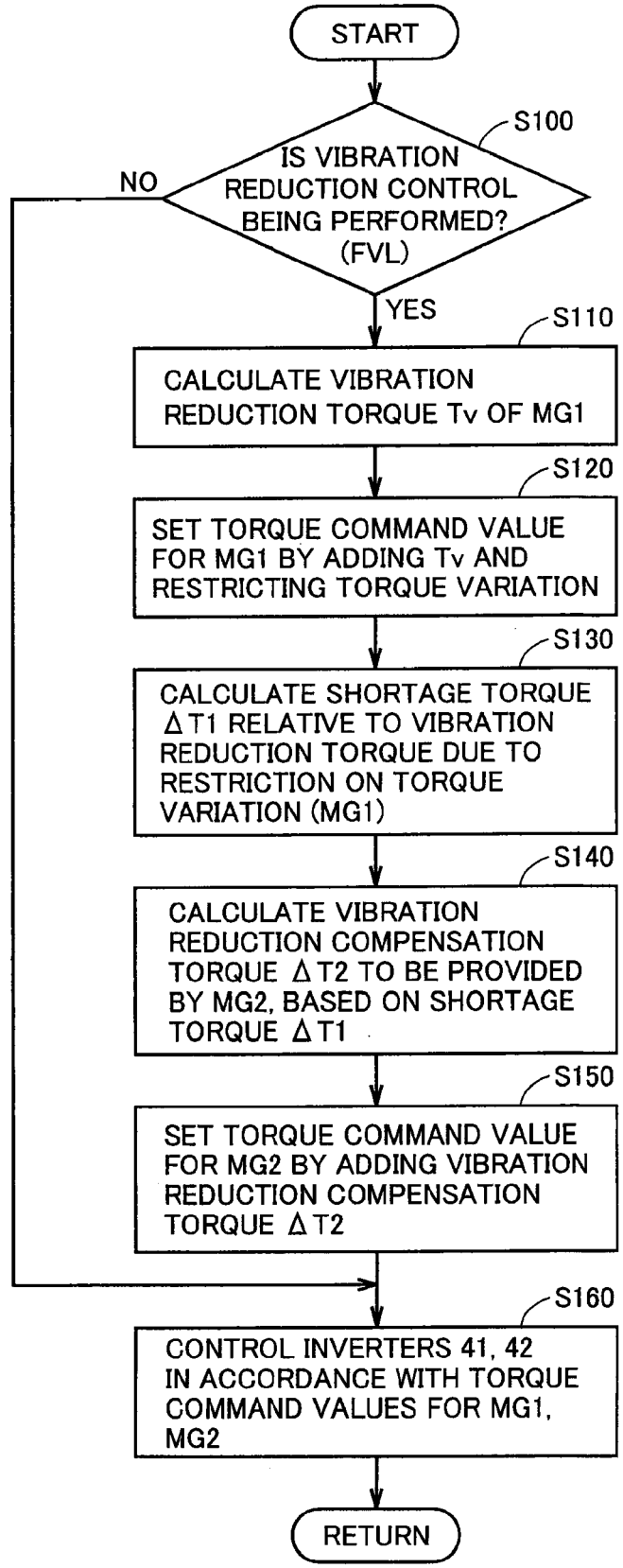
FIG. 8 is a flowchart showing a procedure of a control process for implementing setting of torque command values for motor generators when the engine is started in the hybrid vehicle according to the first embodiment.

FIG. 8 is a flowchart showing a procedure of a control process for implementing setting of the torque command values for the motor generators when the engine is started, according to the functional block diagram shown in FIG. 6.

The control process shown in FIG. 8 can be executed by any of HVECU 70 and motor ECU 45, as described above, or the functions may be divided between these ECUs. Therefore, in the description of FIG. 8, HVECU 70 and motor ECU 45 will collectively be referred to simply as ECU. The control process shown in the flowchart of FIG. 8 is executed periodically in a predetermined cycle.

Referring to FIG. 8, in step S100, the ECU determines whether or not the vibration reduction control is being performed as engine 22 is started. The determination in step S100 can be made based on flag FVL shown in FIG. 6. When the vibration reduction control is being performed (the determination in S100 is YES), the ECU proceeds to step S110 to calculate vibration reduction torque Tv of motor generator MG1 in accordance with crank angle CA. Namely, the process in step S110 corresponds to the function of vibration reduction torque calculation unit 110 in FIG. 6.

In step S120, the ECU sets torque command value Tqcom1 for motor generator MG1 by restricting the torque variation of basic torque command value T1 which is determined by adding vibration reduction torque Tv to base torque Tmg1. Consequently, only a part of vibration reduction torque Tv in step S110 is reflected on torque command value Tqcom1. Namely, the process in step S120 corresponds to the functions of addition unit 120 and torque variation restriction unit 130 in FIG. 6.

Further, in step S130, the ECU calculates shortage torque ΔT1 relative to vibration reduction torque Tv of motor generator MG1, the shortage being generated due to the restriction on the torque variation in step S120. Namely, the process in step S130 corresponds to the function of shortage torque calculation unit 140 in FIG. 6.

In step S140, the ECU calculates vibration reduction compensation torque ΔT2 to be output by motor generator MG2, based on shortage torque ΔT1. Namely, the function in step S140 corresponds to the function of vibration reduction compensation torque calculation unit 150 in FIG. 6. Further, in step S150, the ECU sets torque command value Tqcom2 by adding vibration reduction compensation torque ΔT2. Namely, the process in step S150 corresponds to the functions of torque variation restriction unit 160 and addition unit 170 in FIG. 6.

Then, in step S160, the ECU controls switching of inverters 41, 42 in accordance with torque command values Tqcom1, Tqcom2 for motor generators MG1, MG2. Specifically, feedback control is performed on the output torques of motor generators MG1, MG2, based on torque command values Tqcom1, Tqcom2. For the feedback control of motor generators MG1, MG2, any well-known control method is applicable such as pulse width modulation control and rectangular-wave voltage control, and therefore, a detailed description of the feedback control is not given here.

When the vibration reduction control is not being performed (the determination in step S100 is NO), the process from step S110 to step S150 is skipped. Therefore, in accordance with torque command values Tqcom1, Tqcom2 on which the vibration reduction torque is not reflected, inverters 41, 42 are controlled in step S160.

Here, regarding the vibration reduction control shown in FIGS. 6 and 8, a quick control response to the change of crank angle CA is required. It is therefore preferable that HVECU 70 performs the process to the setting of base torques Tmg1, Tmg2 and motor ECU 45 performs the control process relevant to addition of the periodic torque.

Figure 9:
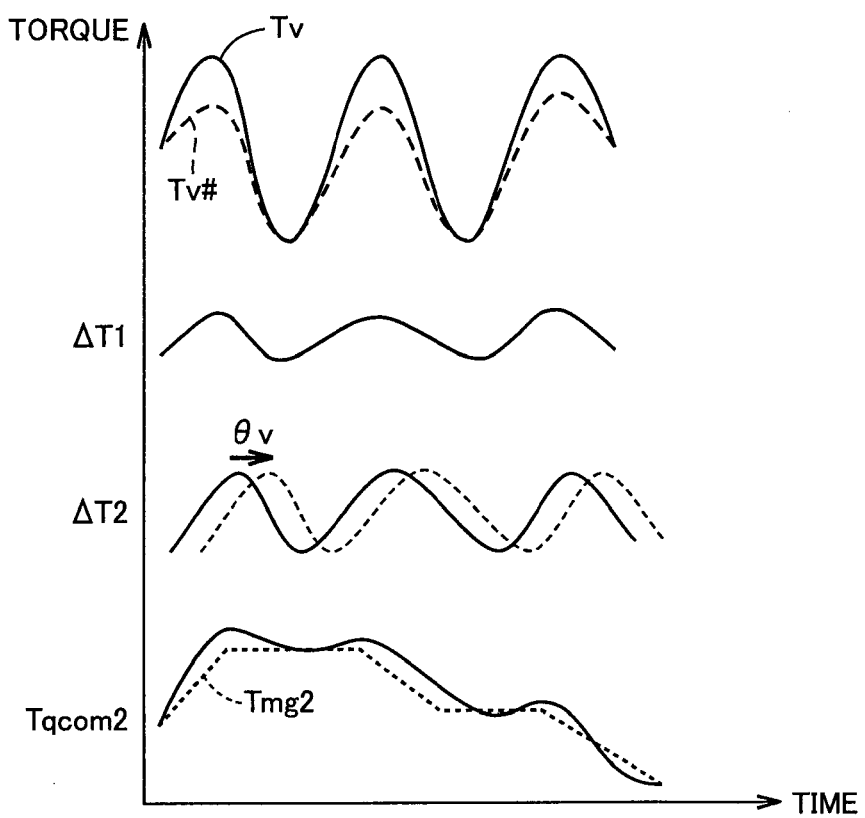
FIG. 9 shows an example of how a torque command value for a motor generator is set under vibration reduction control when the engine is started in the hybrid vehicle of the first embodiment.

FIG. 9 shows an example of how the torque command value for the motor generator is set under the vibration reduction control when the engine is started in the hybrid vehicle of the first embodiment.

Referring to FIG. 9, relative to vibration reduction torque Tv which is calculated based on crank angle CA of engine 22, periodic torque component Tv# reflected on torque command value Tqcom1 for motor generator MG1 has been restricted to a part of vibration reduction torque Tv. As described above, the difference between Tv and Tv# is chiefly generated by low-pass filtering at torque variation restriction unit 130.

From the difference between vibration reduction torque Tv and torque Tv#, shortage torque ΔT1 is calculated. For example, shortage torque ΔT1 can be determined from the difference between the input and the output of torque variation restriction unit (low-pass filter) 130, as described above with reference to FIG. 6.

Further, based on shortage torque ΔT1, vibration reduction compensation torque ΔT2 to be reflected on torque command value Tqcom2 for motor generator MG2 is calculated. As described above, vibration reduction compensation torque ΔT2 can be set by the proportional calculation in consideration of gear ratios ρ and Gr. Torque command value Tqcom2 for motor generator MG2 is set by adding vibration reduction compensation torque ΔT2 to base torque Tmg2.

Consequently, in the hybrid vehicle of the first embodiment, the torque control is performed in accordance with torque command values Tqcom1, Tqcom2 and accordingly the sum of respective output torques of motor generators MG1 and MG2 is provided to thereby ensure motoring torque Tm for engine 22 and vibration reduction torque Tv. In particular, since sharp variations of torque command values Tqcom1, Tqcom2 are suppressed by torque variation restriction units 130, 160, the vibration reduction control under which vibration reduction torque Tv for suppressing torque pulsation when the engine is started is generated can be implemented while the torque controllability of motor generators MG1, MG2 is ensured. As a result, the engine can be started stably for which engine vibrations are suppressed.

Here, as understood from FIG. 1, the torque transmission path from motor generator MG1 to crankshaft 26 and the torque transmission path from motor generator MG2 to crankshaft 26 differ from each other in terms of the length of the path and the components. Therefore, motor generators MG1, MG2 also differ from each other in terms of the transfer function acting on the amount of torsion of torsional damper 28.

Thus, it is preferable that the periodic torque (namely vibration reduction compensation torque $\Delta T2$) for making up for the shortage of vibration reduction torque Tv (shortage torque $\Delta T1$) that is output from motor generator MG2 has a phase difference relative to the vibration reduction torque (Tv-T1) that is output from motor generator MG1.

This phase difference can be provided to more effectively suppress the variation of the amount of torsion of torsional damper 28 depending on the change of crank angle CA. Accordingly, the effect of suppressing vibrations when engine 22 is started can be enhanced. Here, the required phase difference can be determined in advance through an experiment with a real machine.

Specifically, as shown in FIG. 9, vibration reduction compensation torque $\Delta T2$ is calculated so that it has phase difference $\theta v$ relative to shortage torque $\Delta T1$, and thus the above-described phase difference can be provided. For example, vibration reduction compensation torque calculation unit 150 (or step 5140) may calculate vibration reduction compensation torque $\Delta T2$ from shortage torque $\Delta T1$ using a transfer function so that phase-lead compensation (or phase-lag compensation) is made, in addition to the proportional calculation, to thereby provide phase difference $\theta v$. Generally, according to the difference in the length of the path, the phase of vibration reduction compensation torque $\Delta T2$ to be output from motor generator MG2 is preferably advanced relative to shortage torque $\Delta T1$.

[Second Embodiment]

Regarding the first embodiment, the description has been given of the vibration reduction control using both motor generators MG1 and MG2 that is performed when the engine is started. Regarding a second embodiment, a description will be given of switching of the vibration reduction control depending on operation of a parking lock which operates in a parking range (hereinafter also referred to as "P range").

Here, the chief features of the invention in the following embodiments are similar to those of the first embodiment. Therefore, regarding the second and subsequent embodiments, features different from the first embodiment will mainly be described, and the description of the features common to the first embodiment and the second and subsequent embodiments will not be repeated in principle.

Figure 10:
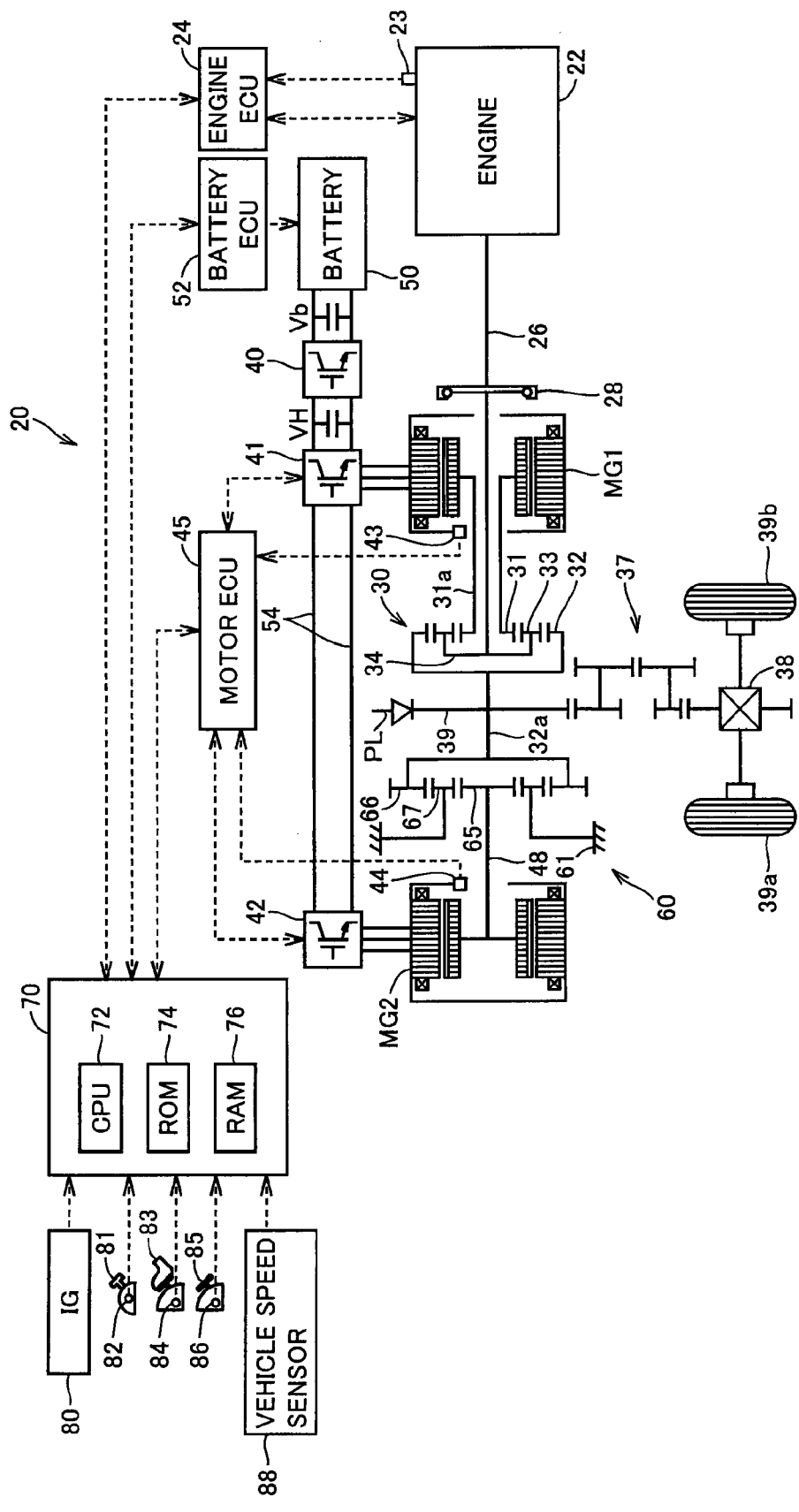
FIG. 10 is a configuration diagram showing a schematic configuration of a hybrid vehicle according to a second embodiment of the present invention.

FIG. 10 is a configuration diagram showing a schematic configuration of a hybrid vehicle according to the second embodiment of the present invention.

Referring to FIG. 10, hybrid vehicle 20 in the second embodiment differs from hybrid vehicle 20 in the first embodiment shown in FIG. 1 in that arrangement of a parking lock mechanism PL is shown in the former. The features of other components of hybrid vehicle 20 are similar to those shown in FIG. 1.

Parking lock mechanism PL is provided for rotational elements included in the power transmission path extending from output shaft 48 of motor generator MG2 to drive wheels 39a, 39b through drive shaft 32a. In the example of FIG. 10, parking lock mechanism PL is provided for a drive gear 39 which is mounted on ring gear shaft (drive shaft) 32a.

Parking lock mechanism PL is configured to lock drive gear 39 so that it does not rotate while the parking lock mechanism is operating and to unlock it while the parking lock mechanism is not operating. Parking lock mechanism PL operates when the driver selects the P range, and fails to operate when the P range is not selected.

In the configuration of the hybrid vehicle in the second embodiment, as parking lock mechanism PL operates, drive shaft 32a is locked so that it does not rotate and therefore rotations of drive wheels 39a, 39b are also suppressed. In this way, hybrid vehicle 20 can be prevented from moving while the P range is selected.

Drive shaft 32a constitutes a part of the torque transmission path extending from motor generator MG2 to crankshaft 26 through power split device 30. Therefore, if parking lock mechanism PL operates to lock drive gear 39 so that it does not rotate, the power transmission path between motor generator MG2 and crankshaft 26 is blocked.

Therefore, in the hybrid vehicle of the second embodiment, when the P range is selected, namely parking lock mechanism PL operates, the output torque of motor generator MG2 cannot be applied to crankshaft 26. Consequently, even if motor generator MG2 outputs vibration reduction compensation torque $\Delta T2$, vibrations of engine 22 cannot be suppressed.

FIG. 11 is a table illustrating a relation between the vibration reduction control and range selection when the engine is started in the hybrid vehicle according to the second embodiment.

Referring to FIG. 11, when the P range in which parking lock mechanism PL operates is selected, motor generator MG2 is not used and the vibration reduction control is performed with motor generator MG1 only when the engine is started. In this case, flag FVL# in FIG. 6 is made OFF and accordingly torque command value Tqcom2 for motor generator MG2 is set without adding vibration reduction compensation torque $\Delta T2$.

In contrast, when the P range is not selected (when the drive range (D range) or the neutral range (N range) is selected for example), namely when parking lock mechanism PL does not operate, the vibration reduction control using both motor generators MG1 and MG2 as described above in connection with the first embodiment is performed when the engine is started. Namely, motor generator MG1 outputs a part of vibration reduction torque Tv and vibration reduction compensation torque $\Delta T2$ for compensating for shortage torque $\Delta T1$ is added to determine torque command value Tqcom2 for motor generator MG2.

As a result, in the hybrid vehicle of the second embodiment, when the P range is not selected, the shortage of vibration reduction torque Tv (shortage torque $\Delta T1$) is compensated for by the output torque of motor generator MG2. When the P range is selected, compensation for the shortage of vibration reduction torque Tv by the output torque of second motor generator MG2 is stopped.

Figure 12:
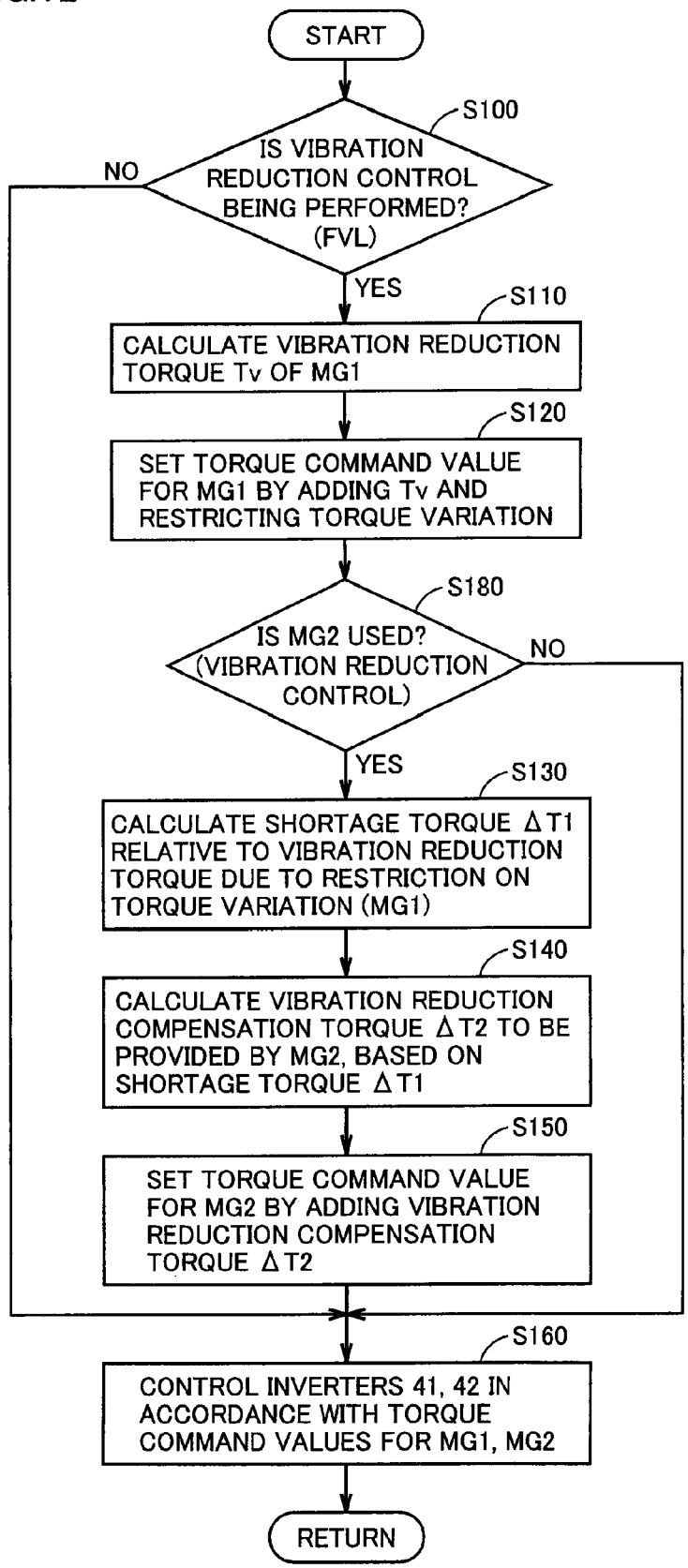
FIG. 12 is a flowchart showing a procedure of a control process for implementing setting of torque command values for motor generators when the engine is started in the hybrid vehicle according to the second embodiment.

FIG. 12 is a flowchart showing a procedure of a control process for implementing setting of the torque command values for the motor generators when the engine is started in the hybrid vehicle according to the second embodiment. In the hybrid vehicle of the second embodiment, the control process following the flowchart in FIG. 12 is performed periodically in a predetermined cycle, instead of the control process following the flowchart shown in FIG. 8.

Referring to FIG. 12, in step S100, the ECU determines whether or not the vibration reduction control is being performed, similarly to FIG. 8. When the vibration reduction control is being performed (the determination in S100 is YES), the ECU performs steps S110, S120 similar to those of FIG. 8 to set torque command value Tqcom1 for motor generator MG1. Namely, in torque command value Tqcom1, the torque variation is restricted for preventing deterioration of the torque controllability. As a result, on torque command value Tqcom1, only a part of vibration reduction torque Tv in step S110 is reflected.

Further, in step S180, the ECU determines whether the vehicle is in the state under which motor generator MG2 can be used for the vibration reduction control. In the second embodiment, it is determined in step S180 whether the P range is selected or not. When the P range is selected, the determination in step S180 is NO. When the P range is not selected, the determination in step S180 is YES.

In the case where the vibration reduction control is performed using motor generator MG2 (the determination in step S180 is YES), the ECU performs steps S130 to S150 similar to those in FIG. 8 to set torque command value Tqcom2 for motor generator MG2. Namely, in torque command value Tqcom2, vibration reduction compensation torque ΔT2 for compensating for shortage torque ΔTv1 of motor generator MG1 relative to vibration reduction torque Tv is added.

In contrast, when the vibration reduction control is performed without using motor generator MG2 (the determination in S180 is NO), the process from step S130 to step S150 is skipped. Therefore, torque command value Tqcom2 is set based on base torque Tmg2 without adding vibration reduction compensation torque ΔT2.

Then, the ECU performs step S160 similar to that in FIG. 8 to control switching of inverters 41, 42 in accordance with torque command values Tqcom1, Tqcom2 for motor generators MG1, MG2. Specifically, feedback control is performed on the output torques of motor generators MG1, MG2 based on torque command values Tqcom1, Tqcom2. In the case where the vibration reduction control is not being performed as described above (the determination in S100 is NO), steps S110 to S150 and S180 are skipped. Therefore, in accordance with torque command values Tqcom1, Tqcom2 on which vibration reduction torque Tv is not reflected, step S160 is performed to control inverters 41, 42.

Thus, in the hybrid vehicle of the second embodiment, when the P range is selected, compensation for the shortage of vibration reduction torque Tv by the output torque of motor generator MG2 is stopped. Therefore, the effects of the vibration reduction control which is performed when the engine is started in the first embodiment can be obtained and additionally, a useless torque can be prevented from being output by motor generator MG2 when the parking lock mechanism is operating. Accordingly, wasteful power consumption and loads on the gears and shafts for example will not occur, and the vibration reduction control of the first embodiment when the engine is started can more appropriately be carried out.

Here, in the hybrid vehicle to which the second embodiment is applied, the place where parking lock mechanism PL is disposed is not limited to the example shown in FIG. 10. Namely, parking lock mechanism PL may be disposed at any place as long as it can lock any of the rotational elements so that it does not rotate, the rotational elements being included in the torque transmission path extending from motor generator MG2 through drive shaft 32a to drive wheels 39a, 39b. When parking lock mechanism PL thus disposed is operating, the torque transmission path extending from motor generator MG2 through power split device 30 to crankshaft 26 is also blocked, and therefore, the vibration reduction control which is performed when the engine is started in the second embodiment can be applied.

[Third Embodiment]

Regarding a third embodiment, a description will be given of switching of the vibration reduction control depending on the control mode of the motor control by inverters 41, 42.

Figures 13, 14:
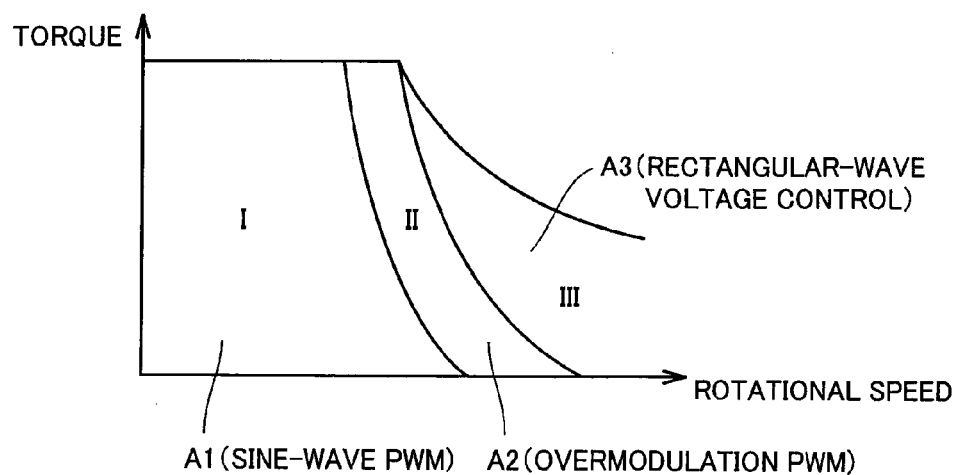
FIG. 13 is a conceptual diagram illustrating selection of a control mode for a motor generator.
FIG. 14 is a conceptual diagram schematically showing a relation between an operating state of the motor generator and selection of a control mode.

Referring to FIG. 13, the motor control by inverters 41, 42 each selects a control mode depending on the state of associated motor generator MG1 or MG2. Specifically, one of PWM control and rectangular-wave voltage control is selected.

Sine-wave PWM control is used as common PWM control, under which ON/OFF of switching devices (not shown) of each phase arm in the inverter is controlled in accordance with a voltage comparison between a sine-wave voltage command value and a carrier wave (typically triangular wave). Consequently, for the collection of the high-level periods corresponding to the ON periods of the upper-arm devices and the low-level periods corresponding to the ON periods of the lower-arm devices, the duty ratio is controlled so that the fundamental wave component is sine wave in a certain period of time.

It is well known that the sine-wave PWM control can increase this fundamental wave component (effective value) to only approximately 0.61 times as high as the inverter's input voltage. Here, in the following, the ratio of the fundamental wave component (effective value) of the voltage (line voltage) applied to motor generators MG1, MG2, to the DC link voltage (DC voltage VH) of inverters 41, 42 will be referred to as "modulation ratio."

As for the rectangular-wave voltage control, one pulse of the rectangular wave in which the ratio between the high-level period and the low-level period in the above-described certain period is 1:1 is applied to the AC motor. Accordingly, the modulation ratio is increased to 0.78.

Under overmodulation PWM control, PWM control similar to the above-described sine-wave PWM control is performed under the condition that the amplitude of the voltage command is larger than the amplitude of the carrier wave. In particular, the voltage command can be distorted relative to the original sine-wave waveform to thereby increase the fundamental wave component and increase the modulation ratio to a range from the highest modulation ratio of the sine-wave PWM control to 0.78. Namely, when the PWM control is applied, the overmodulation PWM control is preferably applied instead of the sine-wave PWM control in a range where the modulation ratio is high.

In motor generators MG1, MG2, the induced voltage increases as the number of revolutions or the output torque increases and accordingly the required drive voltage (required motor voltage) increases. DC voltage VH controlled by converter 40 has to be set higher than this required motor voltage. Meanwhile, the voltage boosted by converter 40, namely DC voltage VH has a limit value.

Therefore, depending on respective operating states of motor generators MG1, MG2, one of the PWM control under which the current feedback is used to control the amplitude and the phase of the motor applied voltage (AC), and the rectangular-wave voltage control is selectively applied. Here, under the rectangular-wave voltage control, the amplitude of the motor applied voltage is fixed. Therefore, the torque control is executed by means of the phase control of the rectangular-wave voltage pulse based on a difference between the actual torque value and the torque command value.

FIG. 14 schematically shows the correspondence between the operating range of motor generators MG1, MG2 and selection of the control mode.

Referring to FIG. 14, generally the sine-wave PWM control is used for a low-speed range A1 for reducing the torque variation, the overmodulation PWM control is used for a middle-speed range A2, and the rectangular-wave voltage control is applied for a high-speed range A3. In particular, the overmodulation PWM control and the rectangular-wave voltage control are applied to improve the output of motor generators MG1, MG2. Motor ECU 45 selects any of the control modes shown in FIG. 13, depending on the operating state of motor generators MG1, MG2 at this time and in a range of the modulation ratio that can be implemented by motor ECU 45.

As described above, the rectangular-wave voltage control fixes the amplitude of the AC voltage applied from inverters 41, 42 to motor generators MG1, MG2 and performs the torque control based on the voltage phase only. Therefore, the torque controllability of the rectangular-wave voltage control is deteriorated relative to the PWM control (particularly sine-wave PWM control).

Thus, for the rectangular-wave voltage control, it is preferable to further restrict the amount of variation of the torque command value by torque variation restriction unit 130 or 160 shown in FIG. 6. For example, when the rectangular-wave voltage control is selected, the time constant of the low-pass filter is set larger than that when the PWM control (particularly sine-wave PWM control) is selected.

Accordingly, when the rectangular-wave voltage control is selected, shortage torque ΔT1 of motor generator MG1 relative to vibration reduction torque Tv when the engine is started is relatively larger. Therefore, even if the time constant of the low-pass filter that is set when the PWM control (particularly sine-wave PWM control) is selected can be used to substantially prevent vibrations (torque pulsation) when engine 22 is started, by means of the output torque of motor generator MG1 in accordance with torque command value Tqcom1, the effect of vibration reduction could be insufficient when the rectangular-wave voltage control is selected.

In view of the above, the third embodiment switches the manner of the vibration reduction control when the engine is started, depending on the control mode for motor generator MG1 by inverter 41.

FIG. 15 is a table for illustrating a relation between the vibration reduction control and the control mode for the motor generators when the engine is started in the hybrid vehicle of the third embodiment.

Referring to FIG. 15, when the control mode for motor generator MG1 by inverter 41 is the PWM control (particularly the sine-wave PWM control), motor generator MG2 is not used and only motor generator MG1 is used to perform the vibration reduction control when the engine is started. As described above, the sine-wave PWM control has the high torque controllability and accordingly can relatively alleviate the restriction by torque variation restriction unit 130, and therefore may be able perform the vibration reduction control by means of motor generator MG1 only without accompanied by occurrence of shortage torque ΔT1 to such an extent that deteriorates the effect of vibration reduction. Therefore, the compensation for the shortage of vibration reduction torque Tv by the output torque of second motor generator MG2, which is described above in connection with the first embodiment, is stopped.

In contrast, when the control mode for motor generator MG1 is the rectangular-wave voltage control, the vibration reduction control by means of both motor generators MG1 and MG2, which is described above in connection with the first embodiment, is performed when the engine is started. Namely, motor generator MG1 outputs a part of vibration reduction torque Tv and vibration reduction compensation torque ΔT2 for compensating for shortage torque ΔT1 is added to the output torque of motor generator MG2. In this way, the shortage of vibration reduction torque Tv (shortage torque ΔT1) is compensated for by the output torque of motor generator MG2.

Here, when the overmodulation PWM control is selected as well, it is preferable to further restrict the amount of torque variation by torque variation restriction unit 130 or 160, relative to the sine-wave PWM control, since the voltage command is distorted. Therefore, when the overmodulation PWM control is selected, the vibration reduction control may be performed similarly to the rectangular-wave voltage control.

Here, the vibration reduction control performed when the engine is started in the third embodiment can be implemented by execution of the determination in S180 of the flowchart shown in FIG. 11 in the second embodiment, based on the control mode for motor generator MG1, by inverter 41.

Thus, in the hybrid vehicle of the third embodiment, the effects of the vibration reduction control performed when the engine is started in the first embodiment are obtained, and additionally the vibration reduction control can appropriately be done when the engine is started according to the first embodiment, depending on the control mode for motor generator MG1 which generates the motoring torque.

Here, it is noted for the sake of confirmation that the configuration of the drive system of hybrid vehicle 20 is not limited to the illustrated ones in FIGS. 1 and 10. For example, to the configurations of FIGS. 1 and 10, transmission 60 configured as disclosed in PTL 1 or configured in another manner can be applied. Further, even to the configuration as disclosed in PTL 2 in which the output shaft of motor generator MG2 and ring gear shaft (drive shaft) 32a are connected without transmission 60 therebetween, the vibration reduction control performed when the engine is started, which is described in connection with the present embodiment, can be applied.

Likewise, while FIGS. 1 and 9 show the configuration in which power split device 30 (three-shaft power input and output mechanism) constituted of a planetary gear train mechanically connects respective output shafts of engine 22 and motor generators MG1 and MG2 to each other, it is noted for the sake of confirmation that application of the present invention is not limited to such a configuration. For example, the vibration reduction control performed when the engine is started, which is described in connection with the present embodiment, can be applied to any hybrid vehicle in which the drive system is configured so that respective output shafts of engine 22 and motor generators MG1 and MG2 are directly or indirectly connected mechanically to each other and accordingly a power transmission path is formed between engine 22 and motor generator MG1 and between engine 22 and motor generator MG2.

It should be construed that embodiments disclosed herein are by way of illustration in all respects, not by way of limitation. It is intended that the scope of the present invention is defined by claims, not by the above description, and encompasses all modifications and variations equivalent in meaning and scope to the claims.

INDUSTRIAL APPLICABILITY

The present invention is applicable to start of the engine in the hybrid vehicle.

REFERENCE SIGNS LIST 20 hybrid vehicle; 22 engine; 23 crank angle sensor; 24 engine ECU; 26 crankshaft; 28 torsional damper; 30 power split device; 31, 65 sun gear; 31a sun gear shaft; 32, 66 ring gear; 32a ring gear shaft (drive shaft); 33, 67 pinion gear; 34 carrier; 37 gear mechanism; 38 differential gear; 39 drive gear; 39a, 39b drive wheel; 40 converter; 41, 42 inverter; 43, 44 rotational position detection sensor; 45 motor ECU; 48 output shaft (MG2); 50 battery: 52 battery ECU; 54 electric power line; 60 transmission; 61 case; 70 HVECU; 74 ROM;

76 RAM; 80 ignition switch; 81 shift lever; 82 shift position sensor; 83 accelerator pedal; 84 accelerator pedal position sensor; 85 brake pedal; 86 brake pedal position sensor; 88 vehicle speed sensor; 110 torque calculation unit; 120, 170 addition unit; 130 torque variation restriction unit (MG1); 140 shortage torque calculation unit; 150 compensation torque calculation unit; 170 torque variation restriction unit (MG2); 200, 210 nomographic chart; A1 low-speed range; A2 middle-speed range; A3 high-speed range; Acc accelerator pedal position; BP brake pedal position; CA crank angle; FVL flag; Gr, ρ gear ratio; MG1, MG2 motor generator; Ne engine's number of revolutions; Nfire ignition-start number of revolutions; PL parking lock mechanism; SP shift position; T1 (basic) torque command value; Tm motoring torque; Tmg1, Tmg2 base torque (vibration reduction torque is not reflected); Tqcom1, Tqcom2 torque command value; Tv vibration reduction torque; V vehicle speed; VH DC voltage.

The invention claimed is:

1. A hybrid vehicle comprising:
an internal combustion engine;
a first electric motor configured to have a power transmission path between the first electric motor and an output shaft of said internal combustion engine, for outputting a motoring torque when said internal combustion engine is started;
a second electric motor configured to have a power transmission path between the second electric motor and the output shaft of said internal combustion engine;
a vibration reduction torque calculation unit for setting, when said internal combustion engine is started, a periodic vibration reduction torque for suppressing torque pulsation occurring as said internal combustion engine rotates, based on a rotational position of the output shaft of said internal combustion engine; and
a torque control unit for controlling output torques of said first and second electric motors so that, when said internal combustion engine is started, a partial torque of said vibration reduction torque is output from said first electric motor and a shortage of said vibration reduction torque due to said partial torque is compensated for by the output torque from said second electric motor.

2. The hybrid vehicle according to claim 1, further comprising a parking lock mechanism operating when a parking range is selected, for locking a rotational element so that the rotational element does not rotate, the rotational element being included in a power transmission path extending from an output shaft of said second electric motor through a drive shaft to a drive wheel, wherein
said parking lock mechanism is located at a position of blocking the power transmission path between the output shaft of said internal combustion engine and said second electric motor, when said rotational element is locked, and
when said parking range is not selected, said torque control unit compensates for the shortage of said vibration reduction torque by the output torque of said second electric motor and, when said parking range is selected, said torque control unit stops compensation for the shortage of said vibration reduction torque by the output torque of said second electric motor.

3. The hybrid vehicle according to claim 1, further comprising:
a first inverter for controlling said first electric motor in accordance with a first torque command value;
a second inverter for controlling said second electric motor in accordance with a second torque command value; and
a motor control unit for selecting a mode of electric motor control by said first inverter and said second inverter each, depending on an operating state of said first and second electric motors, wherein
said mode includes a first control mode to which rectangular-wave voltage control is applied and a second control mode to which sine-wave pulse width modulation control is applied, and
when said first control mode is selected for said first inverter, said torque control unit compensates for the shortage of said vibration reduction torque by the output torque of said second electric motor and, when said second control mode is selected for said first inverter, said torque control unit stops compensation for the shortage of said vibration reduction torque by the output torque of said second electric motor.

4. The hybrid vehicle according to claim 3, wherein
when said first control mode is selected for said first inverter, said torque control unit reduces a ratio of said partial torque to said vibration reduction torque, with respect to a ratio of said partial torque to said vibration reduction torque when said second control mode is selected for said first inverter.

5. The hybrid vehicle according to claim 1, wherein
said torque control unit controls the output torques of said first and second electric motors so that said partial torque that is output from said first electric motor and a periodic torque that is output from said second electric motor for compensating for the shortage of said vibration reduction torque are different in phase from each other.

6. The hybrid vehicle according to claim 1, wherein
said torque control unit includes a first torque calculation unit for setting the first torque command value for said first electric motor by smoothing a variation in time-axis direction of a first torque corresponding to a sum of said motoring torque and said vibration reduction torque.

7. The hybrid vehicle according to claim 6, wherein
said torque control unit includes:
a vibration reduction compensation torque calculation unit for calculating a vibration reduction compensation torque for compensating for the shortage of said vibration reduction torque by said second electric motor, based on a shortage torque corresponding to said shortage of said vibration reduction torque;
a torque variation restriction unit for restricting a variation in time-axis direction of a torque command value for said second electric motor on which said vibration reduction compensation torque has not been reflected; and
an addition unit for calculating the second torque command value for said second electric motor in accordance with a sum of an output of said torque variation restriction unit and said vibration reduction compensation torque calculated by said vibration reduction compensation torque calculation unit.

8. The hybrid vehicle according claim 1, wherein
said torque control unit includes:
a first torque calculation unit for setting, when said internal combustion engine is started, the first torque command value for said first electric motor by adding, to said motoring torque, a partial torque of said vibration reduction torque that is set by said vibration reduction torque calculation unit;
a vibration reduction compensation torque calculation unit for calculating a vibration reduction compensation torque for compensating for the shortage of said vibration reduction torque by said second electric motor, based on a shortage torque corresponding to said shortage of said vibration reduction torque; and a second torque calculation unit for setting, when said internal combustion engine is started, the second torque command value for said second electric motor, so that said vibration reduction compensation torque calculated by said vibration reduction compensation torque calculation unit is reflected on the second torque command value.

9. The hybrid vehicle according to claim 1, further comprising a three-shaft power input and output mechanism mechanically connected to three shafts that are the output shaft of said internal combustion engine, the output shaft (48) of said second electric motor, and an output shaft of said first electric motor, and configured so that, as respective numbers of revolutions of any two of said three shafts are determined, a number of revolutions of the remaining one shaft is determined and, based on power that is input or output to or from any two of said three shafts, power is input or output to or from the remaining one shaft.

10. A method for controlling a hybrid vehicle including: an internal combustion engine; a first electric motor configured to have a power transmission path between the first electric motor and an output shaft of said internal combustion engine, for outputting a motoring torque (Tm) when said internal combustion engine is started, a second electric motor configured to have a power transmission path between the second electric motor and the output shaft of said internal combustion engine; and a control device, said method comprising the steps of:

setting, when said internal combustion engine is started, a periodic vibration reduction torque for suppressing torque pulsation occurring as said internal combustion engine rotates, based on a rotational position of the output shaft of said internal combustion engine with the control device; and controlling output torques of said first and second electric motors so that, when said internal combustion engine is started, a partial torque of said vibration reduction torque is output from said first electric motor and a shortage of said vibration reduction torque due to said partial torque is compensated for by the output torque from said second electric motor with the control device.

11. The method for controlling a hybrid vehicle according to claim 10, wherein said hybrid vehicle further includes a parking lock mechanism operating when a parking range is selected, for locking a rotational element so that the rotational element does not rotate, the rotational element being included in a power transmission path extending from an output shaft of said second electric motor through a drive shaft to a drive wheel, said parking lock mechanism is located at a position of blocking the power transmission path between the output shaft of said internal combustion engine and said second electric motor, when said rotational element is locked, and said method further comprises the step of compensating for the shortage of said vibration reduction torque by the output torque of said second electric motor when said parking range is not selected at startup of said internal combustion engine, and stopping compensation for the shortage of said vibration reduction torque by the output torque of said second electric motor when said parking range is selected at startup of said internal combustion engine with the control device.

12. The method for controlling a hybrid vehicle according to claim 10, wherein said hybrid vehicle further includes:

a first inverter for controlling said first electric motor in accordance with a first torque command value;

a second inverter for controlling said second electric motor in accordance with a second torque command value; and a motor control unit for selecting a mode of electric motor control by said first inverter and said second inverter each, depending on an operating state of said first and second electric motors, said mode includes a first control mode to which rectangular-wave voltage control is applied and a second control mode to which sine-wave pulse width modulation control is applied, and said method further comprises the step of compensating for the shortage of said vibration reduction torque by the output torque of said second electric motor when said first control mode is selected for said first inverter, and stopping compensation for the shortage of said vibration reduction torque by the output torque of said second electric motor when said second control mode is selected for said first inverter with the control device.

13. The method for controlling a hybrid vehicle according to claim 12, wherein said step of controlling includes the step of reducing a ratio of said partial torque to said vibration reduction torque when said first control mode is selected for said first inverter, with respect to a ratio of said partial torque to said vibration reduction torque when said second control mode is selected for said first inverter with the control device.

14. The method for controlling a hybrid vehicle according to claim 10, wherein said step of controlling includes the step of controlling the output torques of said first and second electric motors so that said partial torque that is output from said first electric motor and a periodic torque that is output from said second electric motor for compensating for the shortage of said vibration reduction torque are different in phase from each other with the control device.

15. The method for controlling a hybrid vehicle according to claim 10, wherein said step of controlling includes the step of setting the first torque command value for said first electric motor by smoothing a variation in time-axis direction of a first torque corresponding to a sum of said motoring torque (Tm) and said vibration reduction torque with the control device.

16. The method for controlling a hybrid vehicle according to claim 15, wherein said step of controlling includes the steps of:

calculating a shortage torque corresponding to the shortage of said vibration reduction torque with the control device;

calculating a vibration reduction compensation torque for compensating for the shortage of said vibration reduction torque by said second electric motor, based on said calculated shortage torque with the control device; and restricting a variation in time-axis direction of a torque command value for said second electric motor on which said vibration reduction compensation torque has not been reflected, and calculating the second torque command value in accordance with a sum of the restricted torque command value and said vibration reduction compensation torque with the control device.

17. The method for controlling a hybrid vehicle according to claim 10, wherein
said step of controlling includes the steps of:
- setting the first torque command value for said first electric motor by adding, to said motoring torque, a partial torque of said vibration reduction torque with the control device;
- calculating a shortage torque corresponding to the shortage of said vibration reduction torque due to said partial torque with the control device;
- calculating a vibration reduction compensation torque to be provided by said second electric motor, based on said calculated shortage torque with the control device; and
- setting, when said internal combustion engine is started, the second torque command value for said second electric motor, so that said vibration reduction compensation torque is reflected on the second torque command value with the control device.

\* \* \* \* \*